(12) United States Patent
Doherty et al.

(10) Patent No.: US 10,929,431 B2
(45) Date of Patent: Feb. 23, 2021

(54) COLLISION HANDLING DURING AN ASYNCHRONOUS REPLICATION

(71) Applicant: HEWLETT PACKARD ENTERPRISE DEVELOPMENT LP, Houston, TX (US)

(72) Inventors: Mark Doherty, Belfast (GB); Siamak Nazari, Fremont, CA (US); Jin Wang, Fremont, CA (US); Srinivasa D. Murthy, Fremont, CA (US); Paul Kinnaird, Belfast (GB); Pierre Labat, Fremont, CA (US); Jonathan Stewart, Belfast (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 194 days.

(21) Appl. No.: 15/547,710

(22) PCT Filed: Aug. 28, 2015

(86) PCT No.: PCT/US2015/047391
§ 371 (c)(1),
(2) Date: Jul. 31, 2017

(87) PCT Pub. No.: WO2017/039580
PCT Pub. Date: Mar. 9, 2017

(65) Prior Publication Data
US 2018/0011914 A1    Jan. 11, 2018

(51) Int. Cl.
G06F 16/27    (2019.01)
G06F 11/14    (2006.01)
(Continued)

(52) U.S. Cl.
CPC ............ G06F 16/273 (2019.01); G06F 3/065 (2013.01); G06F 3/0619 (2013.01);
(Continued)

(58) Field of Classification Search
CPC .... G06F 16/27; G06F 16/273; G06F 12/0815; G06F 12/0875; G06F 3/0689;
(Continued)

(56) References Cited

U.S. PATENT DOCUMENTS 5,666,514 A * 9/1997 Cheriton ............. G06F 11/1407
711/141
5,734,818 A    3/1998 Kern et al.
(Continued)

FOREIGN PATENT DOCUMENTS

CN    103473252 A    12/2013
EP    2860912 A1    4/2015
(Continued)

OTHER PUBLICATIONS

International Search Report & Written Opinion received in PCT Application No. PCT/US2015/047391, dated May 30, 2016, 12 pages.
(Continued)

*Primary Examiner* — James E Richardson
(74) *Attorney, Agent, or Firm* — Hewlett Packard Enterprise Patent Department

(57) ABSTRACT

Methods and systems for collision handling during an asynchronous replication are provided. A system includes a cache memory system comprising a number of cache memory pages. A collision detector detects when a host is attempting to overwrite a cache memory page that has not been completely replicated. A revision page tagger copies the cache memory page to a free page and tags the copied page as protected.

14 Claims, 25 Drawing Sheets

(51) Int. Cl.

| | | |
|---|---|---|
| *G06F 11/16* | (2006.01) | |
| *G06F 11/20* | (2006.01) | |
| *G06F 12/0875* | (2016.01) | |
| *G06F 3/06* | (2006.01) | |
| *G06F 12/0815* | (2016.01) | |

(52) U.S. Cl.
CPC .......... *G06F 3/0665* (2013.01); *G06F 3/0689* (2013.01); *G06F 11/14* (2013.01); *G06F 11/1666* (2013.01); *G06F 11/2094* (2013.01); *G06F 11/2097* (2013.01); *G06F 12/0815* (2013.01); *G06F 12/0875* (2013.01); *G06F 11/20* (2013.01); *G06F 11/2007* (2013.01); *G06F 2212/1032* (2013.01); *G06F 2212/621* (2013.01)

(58) Field of Classification Search
CPC ...... G06F 3/0665; G06F 3/065; G06F 3/0619; G06F 11/2094; G06F 11/1666; G06F 11/20; G06F 11/2097; G06F 11/14; G06F 11/2007; G06F 2212/1032; G06F 2212/621; G06F 17/30578
See application file for complete search history.

(56) References Cited

U.S. PATENT DOCUMENTS

| | | | | |
|---|---|---|---|---|
| 5,806,074 | A * | 9/1998 | Souder | G06F 11/2035 |
| 6,230,246 | B1 | 5/2001 | Lee et al. | |
| 6,247,023 | B1 | 6/2001 | Hsiao et al. | |
| 6,317,755 | B1 * | 11/2001 | Rakers | G06F 11/1441 |
| 6,658,540 | B1 | 12/2003 | Sicola et al. | |
| 7,103,586 | B2 | 9/2006 | Holenstein et al. | |
| 7,188,223 | B1 * | 3/2007 | Haase | G06F 11/1469 |
| | | | | 707/999.202 |
| 7,519,633 | B2 * | 4/2009 | Wolfgang | G06F 9/466 |
| 7,624,109 | B2 | 11/2009 | Testardi | |
| 8,086,569 | B2 | 12/2011 | Jasrasaria | |
| 8,301,593 | B2 | 10/2012 | Hoffmann et al. | |
| 8,396,937 | B1 | 3/2013 | O'Krafka et al. | |
| 8,458,650 | B2 | 6/2013 | Andrade et al. | |
| 8,533,404 | B2 | 9/2013 | Condit et al. | |
| 8,620,862 | B2 | 12/2013 | Holenstein et al. | |
| 8,639,818 | B1 | 1/2014 | Vladimirov et al. | |
| 8,676,773 | B2 | 3/2014 | Kumar et al. | |
| 8,700,563 | B1 | 4/2014 | Thomson et al. | |
| 8,799,746 | B2 | 8/2014 | Baker et al. | |
| 8,806,274 | B1 | 8/2014 | Chatterjee et al. | |
| 8,838,539 | B1 | 9/2014 | Ashcraft et al. | |
| 8,898,277 | B2 | 11/2014 | Chen et al. | |
| 8,949,801 | B2 | 2/2015 | Andrade et al. | |
| 8,977,596 | B2 | 3/2015 | Montulli et al. | |
| 10,152,398 | B2 | 12/2018 | Ramakrishnan et al. | |
| 2004/0024807 | A1 | 2/2004 | Cabrera et al. | |
| 2004/0158588 | A1 | 8/2004 | Pruet | |
| 2005/0050115 | A1 | 3/2005 | Kekre | |
| 2005/0102554 | A1 | 5/2005 | Zohar et al. | |
| 2005/0256972 | A1 | 11/2005 | Cochran et al. | |
| 2006/0047713 | A1 | 3/2006 | Gornshtein et al. | |
| 2006/0155770 | A1 | 7/2006 | Asher et al. | |
| 2006/0182050 | A1 | 8/2006 | Dohm | |
| 2007/0011213 | A1 | 1/2007 | Burton et al. | |
| 2007/0156788 | A1 | 7/2007 | Wray | |
| 2007/0250672 | A1 | 10/2007 | Stroberger et al. | |
| 2008/0005507 | A1 | 1/2008 | Madnani et al. | |
| 2008/0016300 | A1 | 1/2008 | Yim et al. | |
| 2008/0022059 | A1 | 1/2008 | Zimmerer et al. | |
| 2009/0049054 | A1 | 2/2009 | Wong et al. | |
| 2009/0157766 | A1 | 6/2009 | Shen et al. | |
| 2009/0313311 | A1 * | 12/2009 | Hoffmann | G06F 11/2094 |
| 2010/0023715 | A1 | 1/2010 | Jibbe et al. | |
| 2010/0082540 | A1 * | 4/2010 | Isaacson | G06F 11/1458 |
| | | | | 707/624 |
| 2010/0191884 | A1 * | 7/2010 | Holenstein | G06F 11/2094 |
| | | | | 710/200 |
| 2010/0306256 | A1 * | 12/2010 | Blackman | G06F 12/0804 |
| | | | | 707/770 |
| 2011/0010498 | A1 | 1/2011 | Lay et al. | |
| 2011/0099342 | A1 * | 4/2011 | Ozdemir | G06F 11/2066 |
| | | | | 711/162 |
| 2012/0254120 | A1 | 10/2012 | Fang et al. | |
| 2012/0310880 | A1 * | 12/2012 | Giampaolo | G06F 16/2471 |
| | | | | 707/610 |
| 2013/0145105 | A1 * | 6/2013 | Sawicki | G06F 3/0619 |
| | | | | 711/147 |
| 2013/0290249 | A1 | 10/2013 | Merriman et al. | |
| 2013/0325804 | A1 * | 12/2013 | Bachar | G06F 16/1847 |
| | | | | 707/634 |
| 2013/0326055 | A1 | 12/2013 | Chatterjee et al. | |
| 2013/0346713 | A1 * | 12/2013 | Beeken | G06F 3/065 |
| | | | | 711/162 |
| 2014/0059311 | A1 * | 2/2014 | Oberhofer | G06F 3/061 |
| | | | | 711/162 |
| 2014/0207850 | A1 | 7/2014 | Bestler et al. | |
| 2014/0258226 | A1 | 9/2014 | Noteboom | |
| 2014/0258777 | A1 * | 9/2014 | Cheriton | G06F 11/1471 |
| | | | | 714/19 |
| 2014/0280871 | A1 | 9/2014 | Brown | |
| 2014/0281131 | A1 * | 9/2014 | Joshi | G06F 12/0804 |
| | | | | 711/103 |
| 2015/0106549 | A1 | 4/2015 | Brown et al. | |
| 2015/0154262 | A1 | 6/2015 | Yang et al. | |
| 2015/0169361 | A1 * | 6/2015 | Busaba | G06F 3/067 |
| | | | | 711/147 |
| 2015/0193346 | A1 * | 7/2015 | Yamamura | G06F 12/0833 |
| | | | | 711/144 |
| 2015/0227536 | A1 | 8/2015 | Montulli et al. | |
| 2015/0248237 | A1 * | 9/2015 | Tsirkin | G06F 3/061 |
| | | | | 711/162 |
| 2015/0341237 | A1 | 11/2015 | Cuni et al. | |
| 2016/0077927 | A1 | 3/2016 | Bhargava et al. | |
| 2016/0171002 | A1 * | 6/2016 | Bendel | G06F 16/122 |
| | | | | 707/714 |
| 2017/0083250 | A1 * | 3/2017 | Beeken | G06F 3/0619 |
| 2018/0210781 | A1 | 7/2018 | McBride et al. | |
| 2018/0260146 | A1 | 9/2018 | Zhou | |
| 2019/0339872 | A1 * | 11/2019 | Kucherov | G06F 3/0631 |

FOREIGN PATENT DOCUMENTS

| | | |
|---|---|---|
| WO | WO-2005045606 A2 | 5/2005 |
| WO | WO-2017/039577 A1 | 3/2017 |

OTHER PUBLICATIONS

Maruthachalam D. et al., "A Distributed System Design for Next Generation Storage and Remote Replication," The Fifth International Conference on the Applications of Digital Information and Web Technologies (ICADIWT 2014), Feb. 17-19, 2014, pp. 22-27.

Arany Péter et al., "SSD Wear_Leveling_Count = 17," Mar. 20, 2018, <https://serverfault.comiquestions/901435issd-wearaleveling-count--17>.

European Search Report and Search Opinion Received for EP Application No. 15903168.1, dated Nov. 7, 2018, 18 pages.

European Search Report and Search Opinion Received for EP Application No. 15903169.9, dated Oct. 17, 2018, 10 pages.

International Search Report & Written Opinion received in PCT Application No. PCT/US2015/047381, dated May 30, 2016, 13 pages.

International Search Report & Written Opinion received in PCT Application No. PCT/US2015/047384, dated May 25, 2016, 10 pages.

International Search Report & Written Opinion received in PCT Application No. PCT/US2015/047388, dated May 30, 2016, 13 pages.

Marty et al., "How Do I interpret Hdd S.M.A.R.T Results?," Aug. 27, 2017, <https:flaskubuntu.comiquestions120393/how-do-i-interpret-hdd-s-m-a-r-t-results/20439#20439>,.

(56) References Cited

OTHER PUBLICATIONS

Microsoft, "The Model for Distributed Systems," (Research Paper), Windows Dev Center, Apr. 1, 2002, 1 page, https:firrisdn,microsoft.cornien-usilibrarylwinclowsidesktoplaa378717(v=vs,85).aspx. ,.

Nick et al., "Samsung SSD 'Wear_Leveling_count' meaning," Oct. 19, 2018, <https://superuser.comlquestions/1037644/samsung-ssd-wear-leveling-count-meaning>.

Oracle, "Database Design Techniques for Real Application Clusters," (Research Paper), Oracle9i Real Application Clusters Deployment and Performance, Release 1 (9.0.1), Feb. 1, 2002, 17 pages, httplidocs.oracle.com/cd/A91202_01/901_doc/rac.901/a89870/clesign.htm.

Zaharia M. et al., "Resilient. Distributed Datasets: A Fault-Tolerant Abstraction for In-Memory Cluster Computing," Mar. 14, 2012, 14 pages, https://www.cs.berkeley.edu/—mateilpapers/2012/nsdi_spark.pdf.

\* cited by examiner

1300

US 10,929,431 B2

COLLISION HANDLING DURING AN ASYNCHRONOUS REPLICATION

BACKGROUND

Replication is a data backup or mirroring technique in which identical data is saved to two or more arrays. A host, such as a server, writes the data to a first storage system. The data is then written from the first storage system to a second storage system.

DETAILED DESCRIPTION

Figure 1:
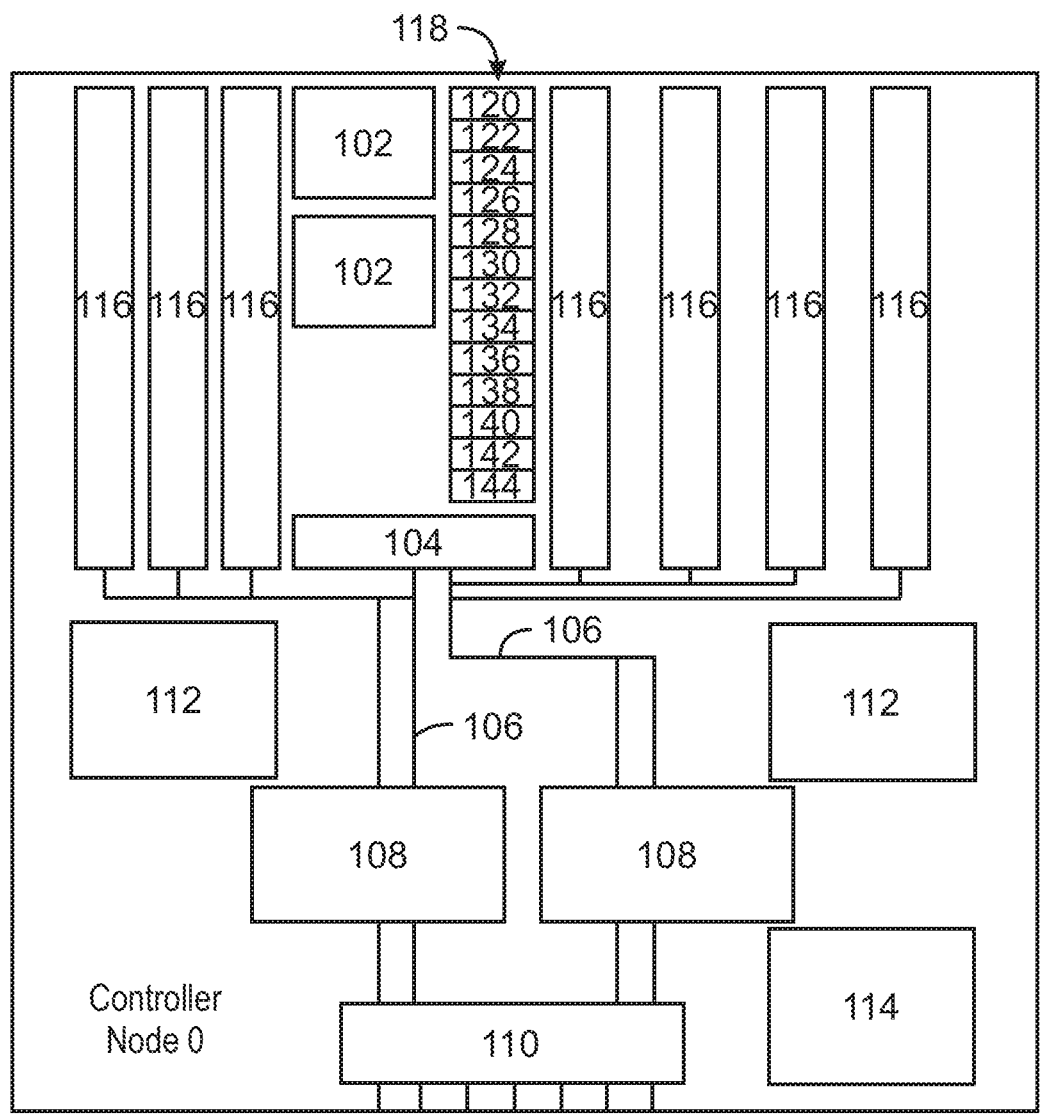
FIG. 1 is a block diagram of an example of a node that may be used in a storage system or array.

The replication of transactions from a source array to a destination array is often performed synchronously, with each transaction acknowledged before another transaction is sent. As used herein, transactions will generally refer to write transactions from a host to a source array or from a source array to a destination array, which may also be termed IOs (input-outputs).

However, in synchronous replication, individual transactions may need to have cross reference dependencies supplied by a central source on each distributed system. Synchronous replication requires an acknowledgement from the destination array which means that the host IO is exposed to the latency of the link between the source and destination arrays. This adds significant overhead that may slow the number of transactions that can be completed in a time period and may limit the number of different arrays that may be used.

Methods and systems described herein use an asynchronous streaming process to replication transactions from a source array to a destination array. However, asynchronous operations may be vulnerable to issues such as scrambled data from link latency, overwriting of data in collisions, and lost transactions due to link or node failures. Further, asynchronous streaming replication should avoid write ordering issues whereby transactions are applied in different orders on the source and destination arrays. If the stream is interrupted the data on the destination should be in a time consistent state, in other words that the transactions are applied in the same order on both source and target arrays.

The techniques described herein may help mitigate these issues by associating the transactions using a common property. This allows the creation of a set of transactions that may be transferred between systems and processed with a significantly lower overhead than attempting to manage each independent transaction. The design of the solution has a number of components operating on each origination node of the source array which combine to create a set. Transactions are tagged using a cluster wide correlator and added into a subset using the same correlator.

A set is defined as a number of transactions which share a common property for processing purposes, for example, the interval of time in which the transaction were received. The problem becomes more complex when applied to a distributed system with a number of nodes all operating independently. To solve this problem in clustered processing environment, each origination node in the source array will create a subset using the same common property. The subset will be tagged with an origination node identifier and a target node identifier such that all transactions in the subset relate to a single node, the origination node, and may be processed by a single node, the target node. Therefore, each set will comprise of a number of subsets, one for each origination node in the source array.

When a new cluster wide correlator is provided, the subsets relating to the preceding cluster wide correlator are considered complete, and each origination node will report the number of transactions in its subset to a central control point which will accumulate this meta-data from all origination nodes. The central control point will then respond to the origination nodes with a total number of transactions for the complete set along with any dependency data to ensure sets are applied in a strict sequence. Each origination node will then generate a subset manifest which contains the number of transactions in the local subset, the number of transactions in the complete set and the previous set that must be processed before this set can be processed.

The distributed manifest management design keeps track of a sequence of transactions on a distributed system by providing a mechanism for associating independent transactions with a common property across a distributed platform. Further, by sequencing sets of transactions rather than each individual transaction solutions can be scaled much larger. These transaction sets can be used for the purposes of transmission and processing across a number of distributed platforms.

The use of the distributed set management also allows a number of transactions to be in progress at the same time, and for all transactions to be recovered in the correct order. Signals are sent between the origination nodes in the source array related to the sequence of transactions both on creation of sets and subsets and also when replication operations are completed. As transactions are completed on all origination nodes of the source array, the last completed transaction is circulated to all origination nodes in the source array which then ratchet to that particular transaction number.

In the event of a node failure in the cluster the data required to generate this meta-data for the subset accountancy may be spread across the surviving origination nodes in the cluster. Other origination nodes in the cluster may recover the failed transactions and continue the sequence from the last completed transaction seamlessly. The sequence of transactions may be replayed from the oldest transaction found on all remaining origination nodes in the source array. This allows for the tracking a sequence of transactions across a distributed cluster of nodes and recovering the sequence in the event of a node failure in the distributed system.

A partial manifest recovery mechanism allows the recovery of data sets from across a distributed system after a node failure during asynchronous streaming replication. Each surviving origination node may generate a partial manifest for the recovered subset meta-data which will be forwarded to the target node along with a unique sender node identifier which represents the origination node which recovered that part of the subset.

The logged transactions and partial subset manifests are transferred to the target node which determines if the subset is complete by comparing the number of unique transactions received with the contents of the manifest. The partial manifest design allows each origination node to account only for transactions it has tracked and send a partial manifest for the transactions recovered by that origination node. The target node should have received, or be in the process of receiving, all of the transactions. The target node will then receive a number of unique partial manifests for this subset, which it can then accumulate to complete the set. When the target node has received all of the transactions for this subset as indicated by the accumulated partial manifests then the subset is complete and can be processed when the dependent set is complete.

During synchronous replication any write transactions are replicated to the destination array while retaining exclusive access to the region of the storage volume. Only when the destination array has responded will the next write transaction to that region of the storage volume be permitted.

During asynchronous replication write transactions are written to the source array and acknowledged back to the connected host server before being replicated to the remote storage array. To maintain data integrity, the order of write transactions that are applied on the source array is retained on the target array, therefore the previous data cannot be overwritten until it has been replicated to the destination array. However access to the local volume must be permitted.

In the event of a collision, e.g., wherein a connected host server attempts to write to a region of the storage volume before the previous data in that region has been replicated, techniques described herein preserve this data without resorting to logging the data to a journal. To perform this function, all write transactions that are being replicated are tracking during asynchronous streaming replication using a revision request that tracks pages in a page cache memory. In the event of a collision the revision request detects this collision and may create a duplicate of the affected pages on two nodes of the cluster for redundancy purposes.

A log entry that describes the revision page may be created between the origination node and the target node to protect against node failure. The advantage of using revision pages is to hold collisions without resorting to a journal to track every transaction.

In a journal based design, host write transactions are written to the source array and logged to a transaction journal, which is used to hold these transactions until they can be replicated to the destination array. A large journal may be used to hold many minutes of backlog data, making the system resistant to failures. However, the use of a journal to store write ordered transactions across a cluster of nodes may become very complex as the number of arrays increases and the backlog introduces some latency into the system, which may slow the replication process.

The techniques described herein, use a page cache memory to enhance the speed and scalability of the replication process. In a cache memory design, host write transactions are written to the source array and held in cache memory for replication to the destination array. The speed of the cache memory provides fast access to the transaction data being held in cache memory. Further, in comparison to a journal based design, a smaller number of transactions are backlogged waiting for a response from a journal.

FIG. 1 is a block diagram of an example of a node 100 that may be used in a storage system or array. The node 100 may be part of either a source array, e.g., coupled to a host, or a destination array, e.g., storing replicated transactions. The node 100 may include one or more processors 102. The processors 102 can include a single core processor, a dual-core processor, a multi-core processor, a computing cluster, a virtual processor in a cloud computing arrangement, or the like.

A chip set 104 may provide interconnects 106 between the processors 102 and other units in the node 100. The interconnects 106 may include Peripheral Component Interconnect Express (PCIe), Fibre Channel, Quick Path interconnect (QPI) from Intel, Hypertransport® from AMD, Ethernet, and the like. In some examples, a bus may be used instead of, or in addition to, the interconnects 106.

The interconnects 106 may couple input/output chips 108 to the chip set 104. The input/output (I/O) chips 108 may control communications with other nodes 100 in a cluster, for example, through a router or switch 110. The I/O chips 108 may include, for example, an I/O controller hub (ICH) from Intel or a fusion controller hub (FCH) from AMD, among others. The switch 110 may provide PCIe, or other links, between the node and every other node in an array. The switch 110 may be combined with other chips, such as the I/O chip 108. In some examples, the switch 110 may be an independent chip, such as a PCIe switch from Integrated Device Technology.

Cache memory 112 may be coupled to the processors 102 through the chip set 104. Other cache memory 114 may be used by the I/O chips 108 to provide buffers during data transfer. The cache memory 112 or 114 may include paged cache memory, for example, storing data in blocks. The cache memory 112 or 114 may be integrated with the processors 102 or the I/O chips 108, respectively, or may be separate RAM that is coupled to the processors 102 or the I/O chips 108 through interconnects 106.

The interconnects 106 may couple to a number of interface slots 116. The interface slots 116 may provide an interface to additional units, such as hosts, drives, solid state drives, nodes 100 on other arrays, and the like. In some examples, solid state drives may be directly plugged into the interface slots 116 to provide storage volumes. In other examples, external disk arrays may interface to the node 100 through cards seated in the interface slots 116.

A storage device 118, functioning as a non-transitory, machine readable medium, may be used to hold code modules to instruct the processors 102 to perform the functions described herein. The storage device 118 may include memory closely coupled to the processors, as indicated in FIG. 1, or may include drives or other longer term storage devices. The code modules may include, for example, a sequence number generator 120 to provide a replication ticket for a transaction to be replicated to a destination array, as discussed further herein. A transaction communicator 122 may send transactions to a target node in a destination array.

Sets may be managed by a subset manager 124 and a set manager 126. The subset manager 124 may group the transactions into sets, based in part on a time interval in which the transaction occurred, and then build a subset manifest for transactions to the node 100, based on a total count of transactions received from the set manager 126. The set manager 126 may receive the transaction count from the subset manager on each of a number of nodes and create a total count of all transactions that occurred within the time interval. While the set manager 126 may be present on every node 100 in an array, it may only be active on one on the nodes at any one time.

A remote copy ticket dispenser 128 may provide a replication ticket for a transaction to be replicated to a destination array. A detector 130 may identify link failures and determine reasons for the link failure, for example, if a communications link has failed or if a node has failed. A failure handler 132 may determine actions needed to communicate transactions to a target node. A replayer 134 may play back logged, or mirrored, transactions for a failed origination node so that the accounting for the transactions may be performed to create the manifests. A collision detector 136 may detect when a host is attempting to overwrite a cache memory page that has not been completely replicated. A revision page tagger 138 may mark a cache memory page as protected. A page merger 140 may combine pages that have detected collisions and have the same sequence number. A snapshot system 142 may capture a snapshot of the source array at a point in time to enable resynching of the source array and destination array. A synching system 144 may use the snapshot to resynchronize the source array and the target array, for example, after a restart.

The items shown in FIG. 1 are not to imply that every item is present in every example. For example, a smaller system that only has a single node in a source array may not include one or both of the I/O chips 108. Further, other items may be present, such as modules to control the basic operations of the system.

Figure 2:
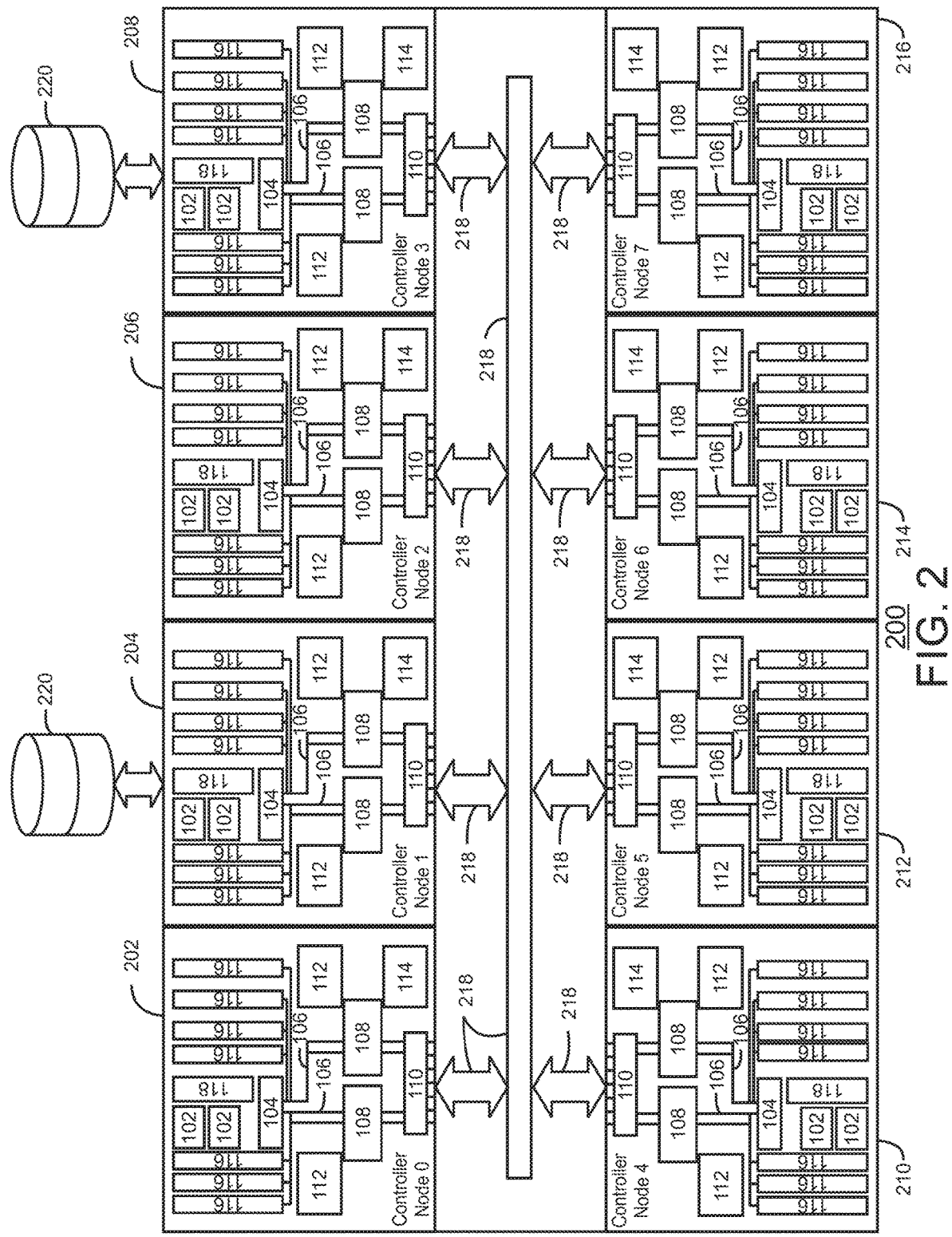
FIG. 2 is a block diagram of an example storage system, or array, formed from a cluster of nodes that are in communication with each other.

FIG. 2 is a block diagram of an example storage system, or array 200, formed from a cluster of nodes 202-216 that are in communication with each other. Like numbered items as described with respect to FIG. 1. The array 200 may include interconnects 218 that allow each node 202-216 to access every other node 202-216 in the cluster. Communications with nodes in other arrays, such as a destination array, may be taken care of by interface cards in the interface slots 116. Further, each of the nodes 202-216 may have associated drives or volumes 220. Although these are shown as external units for two nodes in FIG. 2, as described with respect to FIG. 1, in some examples, the volumes may be installed in cards mounted in the slots of a node 202-216.

This example in FIG. 2 is not to imply that the array 200 includes eight nodes in every case. In some examples, the array 200 may have four nodes, two nodes, or may be a single node. In other examples, larger clusters may be possible, including, for example, 16 nodes, 32 nodes, or more.

Figure 3:
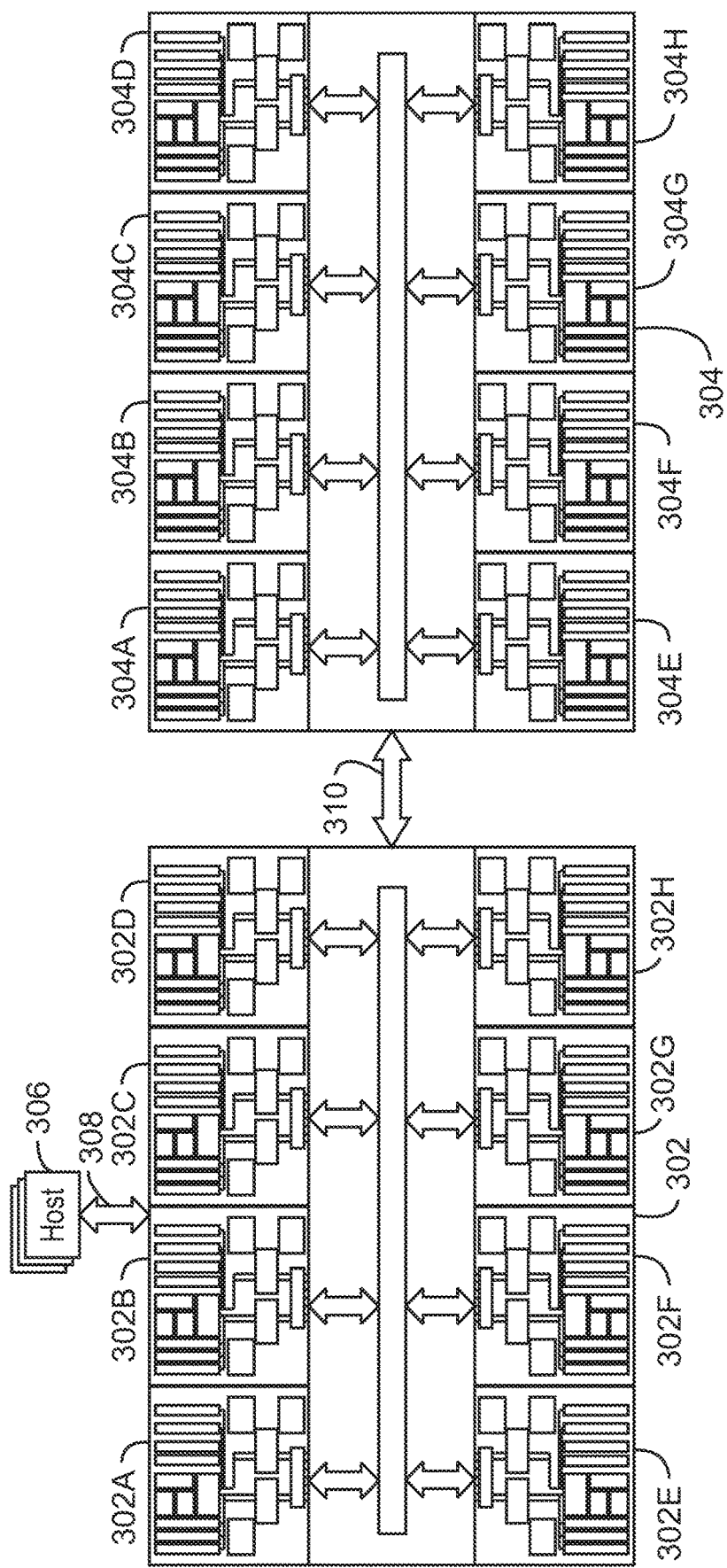
FIG. 3 is a block diagram of an example of a replication system showing a source array in communication with a destination array.

FIG. 3 is a block diagram of an example of a replication system 300 showing a source array 302 in communication with a destination array 304. One or more hosts 306 may be in communication with the source array 302. The links 308 from the hosts 306 to the source array 302 may be through interface cards installed in the interface slots 116 (FIG. 1) in the nodes. The links 310 from the source array 302 to the destination array 304 may also be through interface cards installed in the interface slots 116.

The hosts 306 may provide write transactions to source nodes 302A-302H in the source array 302 to be saved to a volume. The transactions may be copied to the destination array 304 for replication. A transaction provided to an origination node 302A-302H in the source array 302, such as node 302A, may be replicated in a target node 304A-304H in the destination array 304. Specific nodes, such as 302A and 304A may be paired, but this may not be present in every example.

Figure 4:
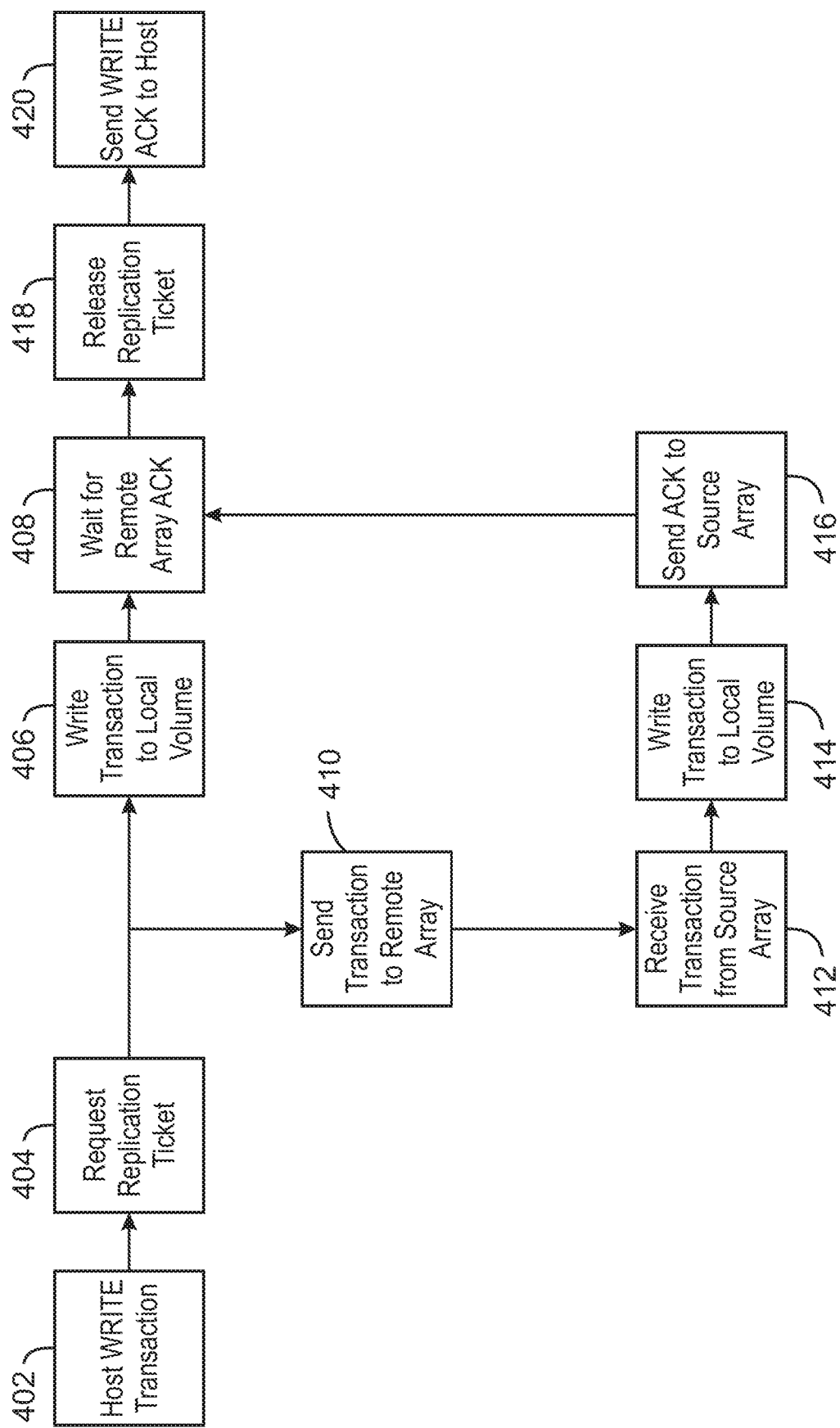
FIG. 4 is a process flow diagram of an example of a synchronous replication process.

FIG. 4 is a process flow diagram of an example of a synchronous replication process 400. The synchronous replication process 400 starts at block 402 with a source array receiving a write transaction from a host. At block 404, the source array may request a replication ticket for replicating the transaction to the destination array. At block 406, the transaction is written to a local volume in the source array. At block 408, processing of the transaction is paused to wait for an acknowledgment from the destination array. At the same time as writing the data to the local volume, at block 410 the source array sends the transaction to the destination array. At block 412, the destination array receives the transaction from the origination node. At block 414, the transaction is written to a local volume local in the destination array. At block 416, the destination array returns an acknowledgment to the source array. Once the source array receives the acknowledgment, at block 418, the replication ticket is released. A write acknowledgment may then be returned to the host at block 420.

The host application uses read and write transactions to the storage array to access data. Although many different transactions may be issued concurrently, dependent ordering is protected as the transaction will be issued serially from the host application. The transactions are ordered correctly as they are synchronous, and, thus, the host will not receive an acknowledgement until the transaction is complete. Further, any dependent requests will be delayed until the current transaction is complete. Accordingly, using synchronous replication the order of the write transactions is naturally preserved.

In contrast to synchronous replication, asynchronous replication does not necessarily maintain the order of the write transactions. In asynchronous replication, the host application will receive a write acknowledgement before the transaction has been replicated. This may allow a new write transaction to be applied to the source volume before the old transaction has been replicated to the target volume. Thus, the transactions may be reordered on the target array, scrambling the data.

Figure 5:
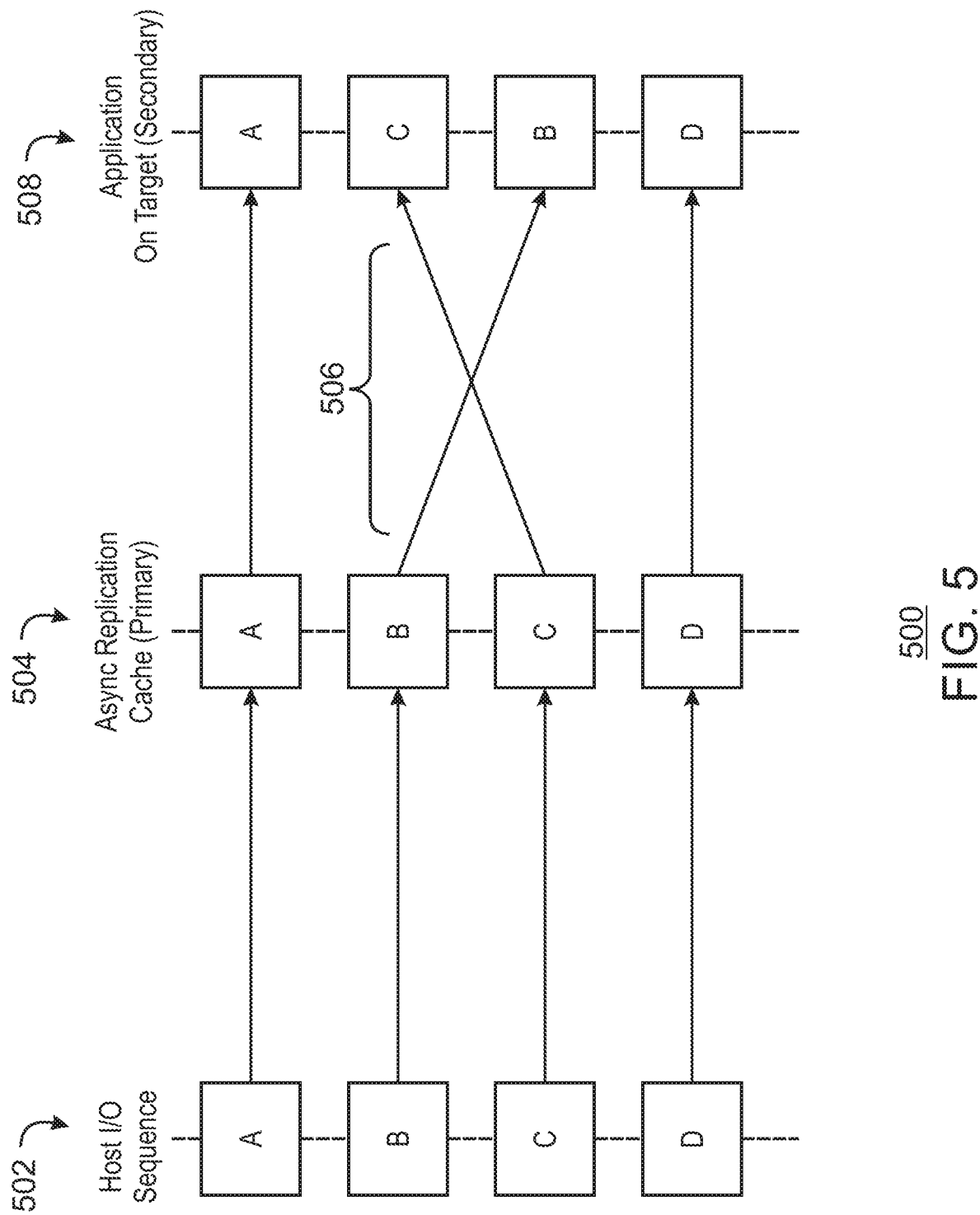
FIG. 5 is a schematic example of blocks being scrambled during an asynchronous replication.

FIG. 5 is a schematic example of blocks 500 being scrambled during an asynchronous replication. In the example, in a host I/O sequence 502, four write transactions A, B, C, and D have been sent to a source array. The four transactions are written to an asynchronous replication cache 504 to wait transfer to a destination array. However, during the transfer, a latency 506 in the connection slows the transfer of the B block, causing it to arrive after the C block, causing it to arrive at the target. As a result, the C and B blocks are reversed during the application 508, e.g., during storage on a volume on the destination array.

This problem may be compounded by the clustered architecture of the storage array. Attempting to provide dependencies between individual transactions across the nodes of the storage array would be difficult or impossible. To simplify the problem transactions are grouped into sets of transactions and applied in blocks on the target array. Until a complete set is applied the group will not be in a consistent state. If the set cannot be fully applied then the replication group will be inconsistent. This is further discussed with respect to FIG. 6.

Figure 6:
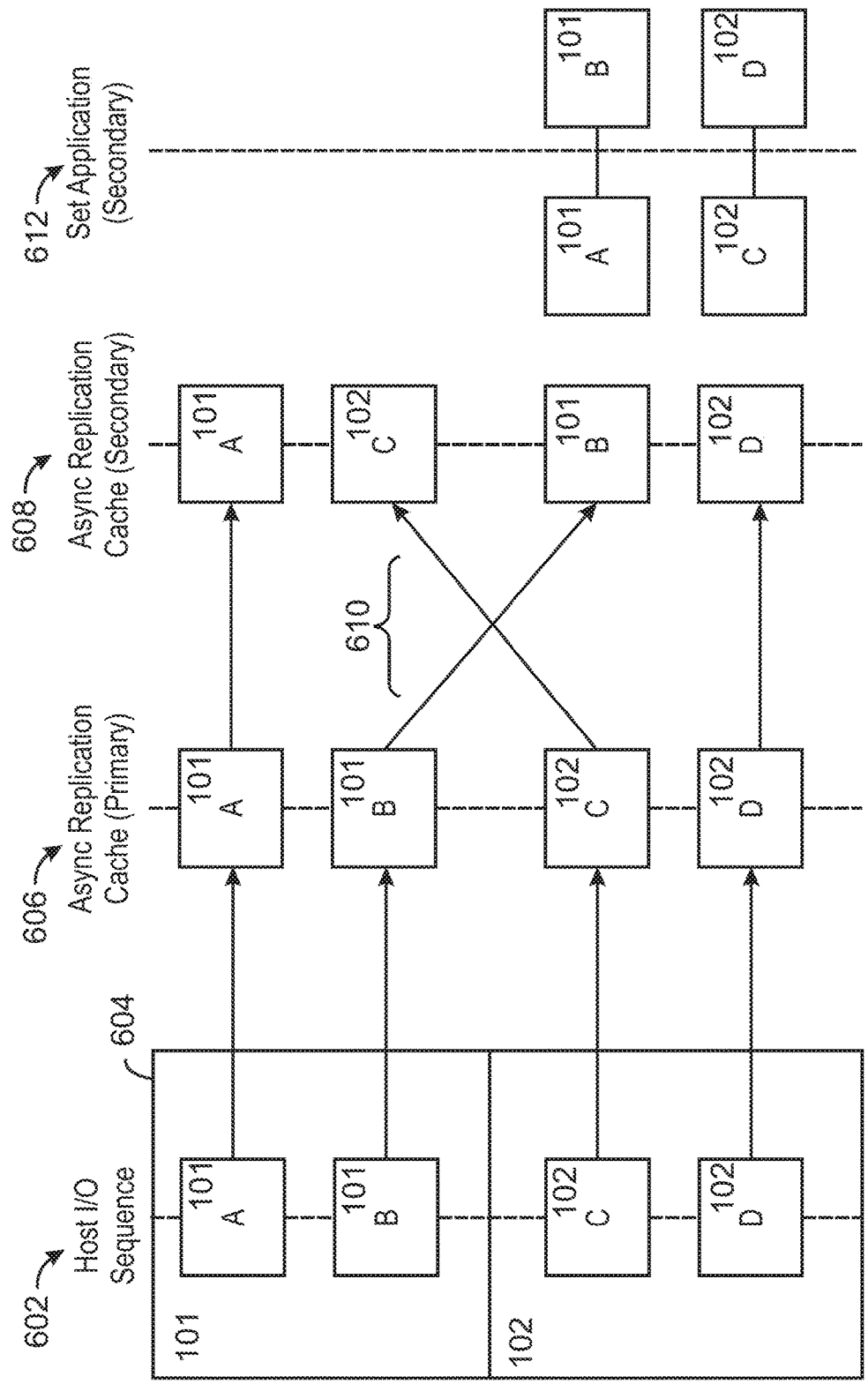
FIG. 6 is a schematic example of a cluster wide correlator used to correct write ordering in asynchronous streaming replication.

FIG. 6 is a schematic example of a cluster wide correlator used to correct write ordering in asynchronous streaming replication. Each cluster wide correlator may, for example, cover a time interval that is shared across all nodes on the source array. The cluster wide correlator may be used to tag replication transactions across all nodes for the purposes of providing a dependency. The cluster wide correlator may be a sequence number mapped from the time intervals during which transactions arrive.

As for the example of FIG. 5, a host writes a series of transactions 602, e.g., A-D, to a source array. In this example, the transactions being written in a first time interval 604 are assigned a first sequence number, e.g., 101, and transactions being written in a second time interval are assigned a second sequence number, e.g., 102. This sequence number remains with the transactions as they are written to a replication cache 606 on the primary or source array. When the transactions are written to the secondary or destination array 608, transactions B and C are again reversed due to a latency 610 in the transfer. In this example, the sequence number, which is associated with each transaction, may be used to correct the order of the transactions, ensuring that they are applied 610 to the volume associated with the destination array in the correct order.

The sequence number may be combined with other identification to generate a replication ticket, for example, in a remote copy ticket dispenser. Transactions that require synchronous or asynchronous periodic replication each request a ticket from the remote copy ticket dispenser. The ticket is used to track the replication transactions and may provide a simple level of collision handling when multiple transactions wish to access the same region of a volume concurrently. In asynchronous streaming, the tickets are associated into sets, which may be used to provide dependencies between each set to ensure that the sets of IOs are applied in the correct sequence.

A set is cluster wide, e.g., across a source array, and includes a number of subsets, one subset per replication group per node. A set is a collection of transactions that have replication tickets that are created by cluster sequence number and replication group id:

<seqno>.<grpid>

A subset is a subcomponent of a set which covers only those transactions local to a single origination node, for example, 0 to 7:

<seqno>.<grpid>.<nid>

For example, the sequence number may represent sequential 100 ms intervals during which the associated transactions arrived. The replication group identification may represent all of the transactions for writing an object, such as a particular command, directory, or file. As host write transactions are received they request a replication ticket which is associated with a set and subset. During subset creation a target node is selected to which all transactions within this subset will be transmitted.

The replication ticket is logged to mirror memory for node down handling, e.g., to protect from node failures. The subset count of the number of transactions is incremented to include this transaction. The replication transaction is transmitted to the remote array with a subset tag containing the set details, e.g., a subset manifest.

Figure 7:
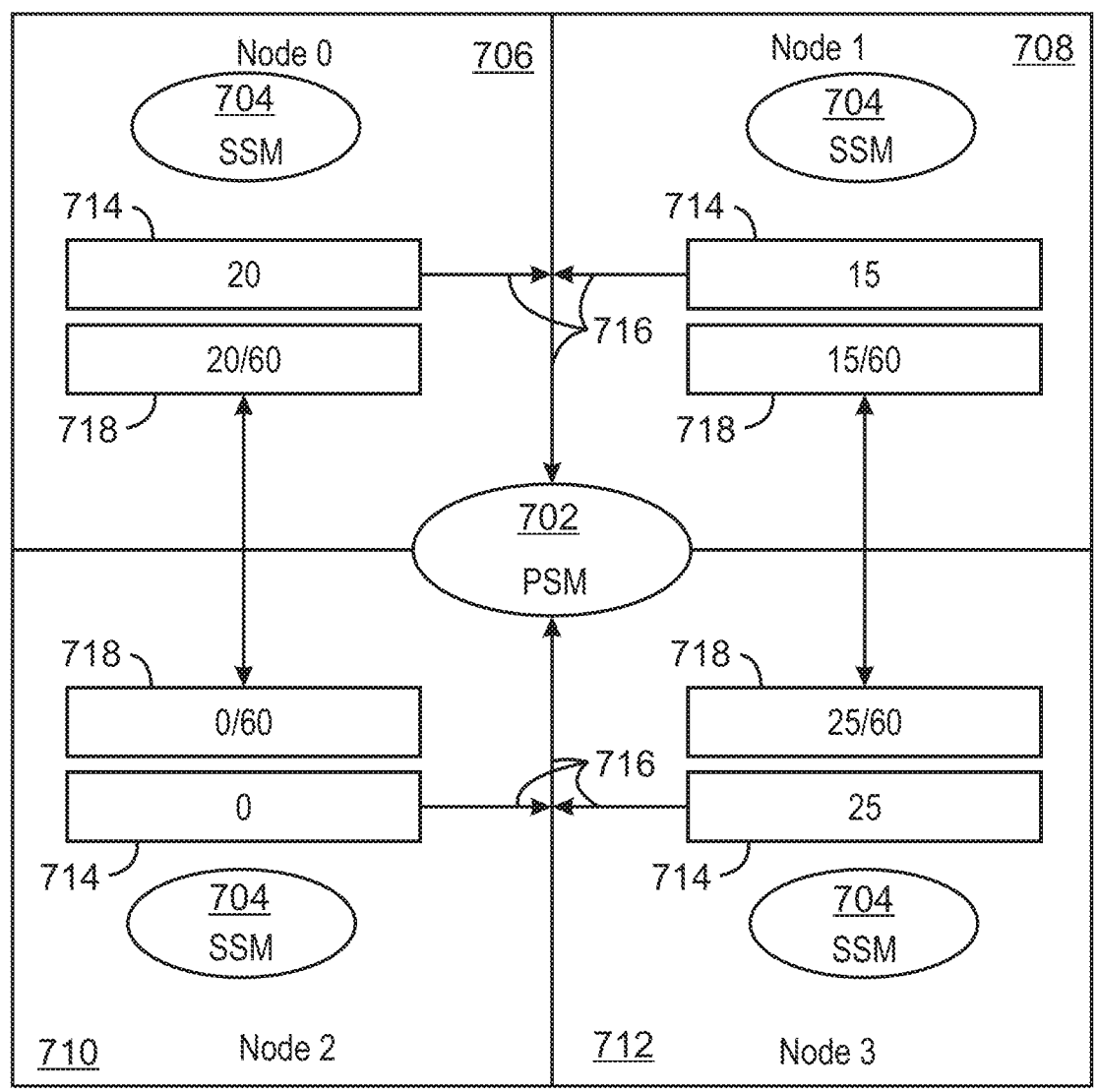
FIG. 7 is a schematic example of a set manager for an array working with secondary set managers on each node to build manifests for transactions written to the nodes.

FIG. 7 is a schematic example of a source array 700 including a set manager 702 working with subset managers 704 on each origination node 706-712 to build subset manifests for transactions written to the origination nodes 706-712. As described herein, the set manager 702 runs on a single origination node 706, 708, 710, or 712 as a highly available process. Other instances of the set manager 702, although inactive, exist as failovers on each of the nodes 706-712.

When the cluster sequencer increments each of the origination nodes 706-712 will be interrogated for their subset totals 714 for the previous cluster sequence number by the set manager 702. Each subset manager 704 will send 716 the subset totals 714 for each asynchronous streaming replication group to the set manager 702. The set manager 702 combines the subset totals 714 into a set total and inform each of the subset managers 704 of this total which the subset managers 704 will use to create a subset manifest 718 that includes at least these totals. It will also resolve the dependency between this set and any predecessors. Each subset manager 704 will then transmit a manifest message to the destination array which contains both the set and subset totals and the dependent sequence number.

Figure 8:
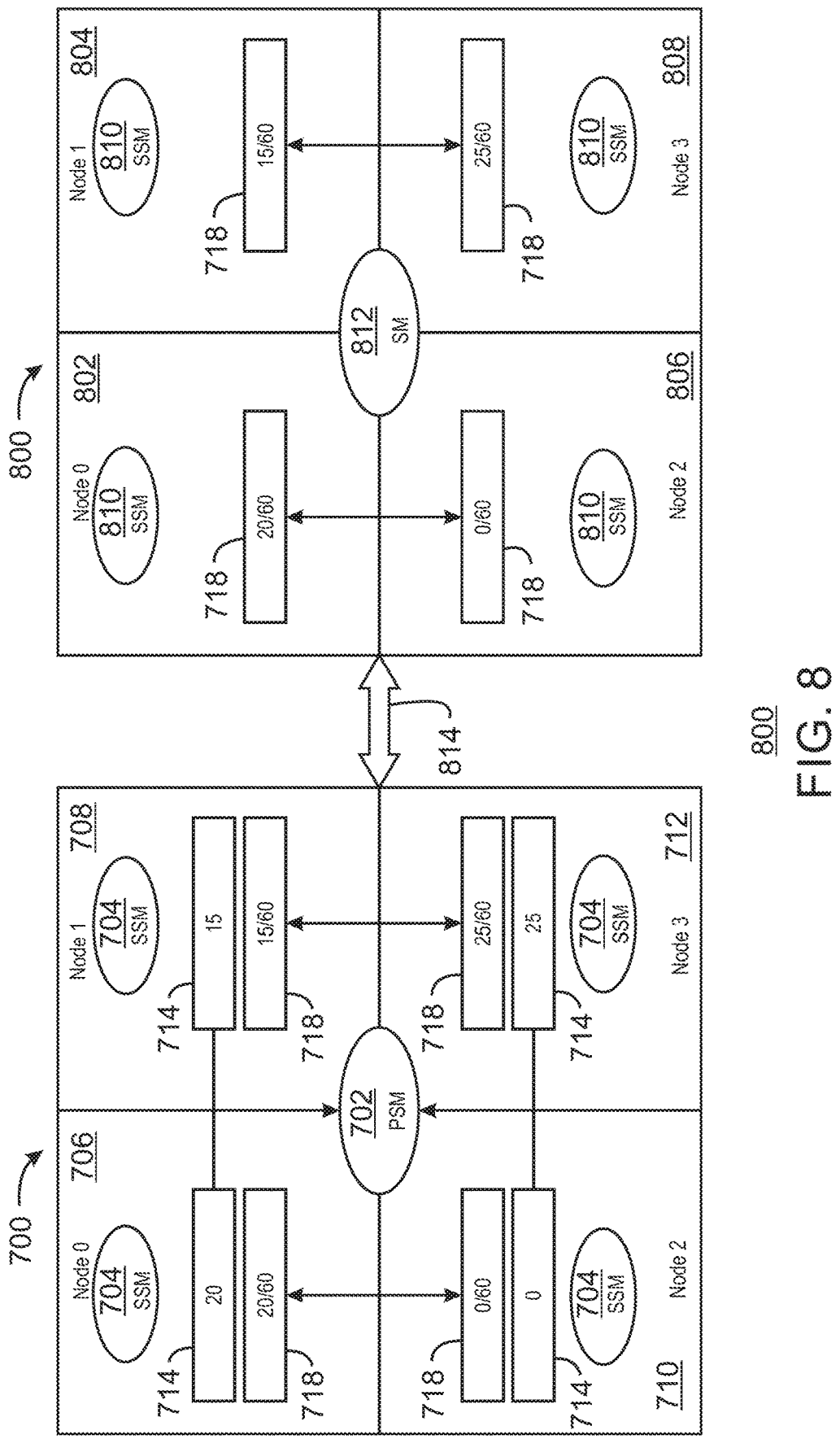
FIG. 8 is a schematic example of manifests from origination nodes in a source array being transferred to target nodes in a destination array.

FIG. 8 is a schematic example of manifests from origination nodes 706-712 in a source array 700 being transferred to target nodes in a destination array 800. Like numbers are as described with respect to FIG. 7. A mirror image of the set and subset management system is also present on the destination array 800. Each target node 802-808 has a subset manager 810 and a set manager 812. As described with respect to the source array 700, the set manager 812 is present on each target node each target node 802-808 for failover purposes, but is only active on one of the target node 802, 804, 806, or 808 at any time. As replication transactions are received from the replication links 814 they are stored in cache memory, duplicated to a target node each target node 802-808 and logged to the cluster mirror memory for node down protection.

Each of the origination nodes 706-712 may send a subset manifest 718 to a corresponding target node 802-808. The subset manager 810 sends acknowledgements to the source array as it receives and protects the transactions prior to being processed by the set manager. The subset manager 810 in each target node 802-808 may confirm to a set manager 720 when all transactions are received in each subset.

Figure 9:
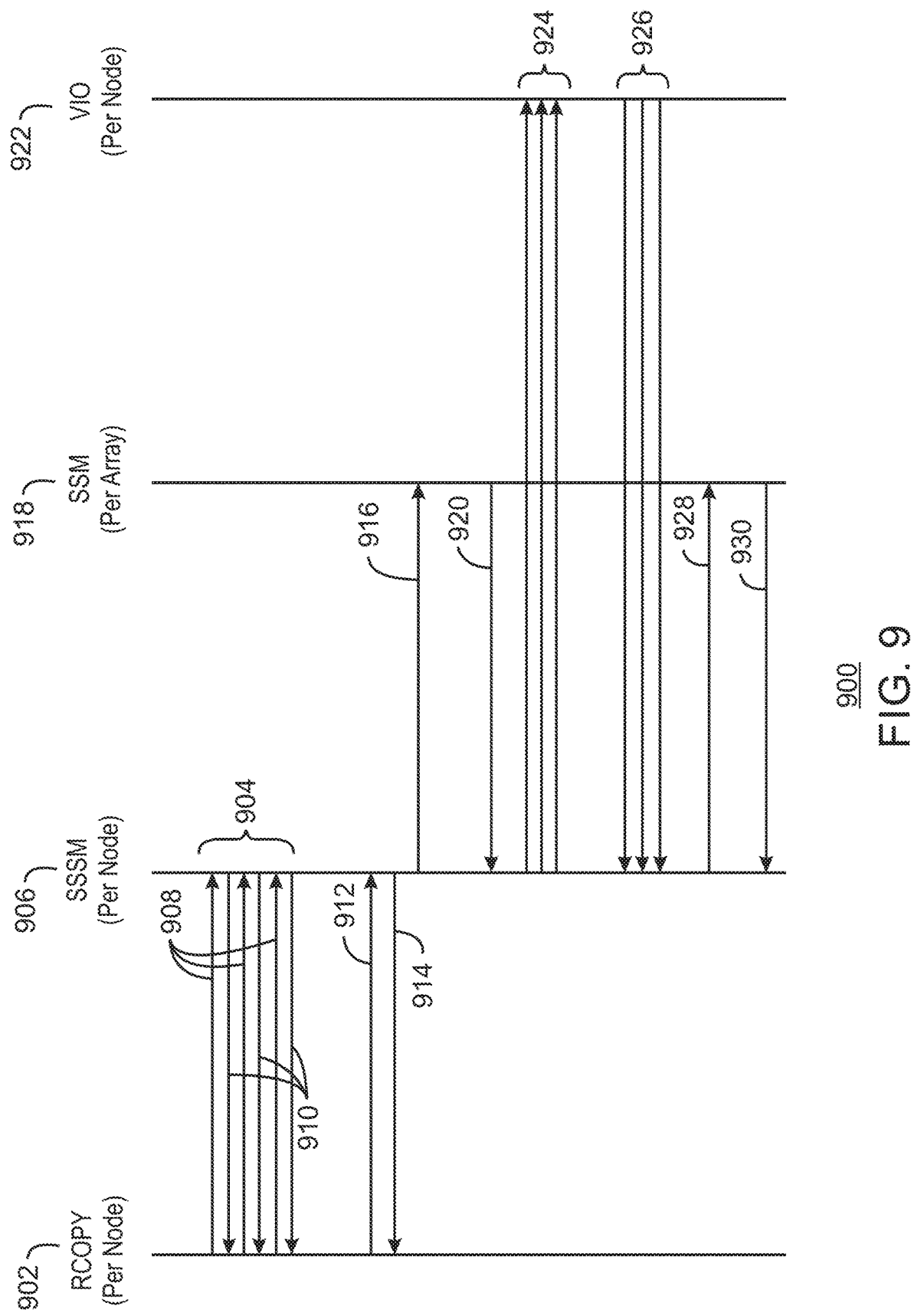
FIG. 9 is a sequence diagram of an example replication transactions from a source array being applied by a target node in an asynchronous replication process.

As described with respect to FIG. 9, once each subset manager 810 has acknowledged their respective subsets back to the source array 700 the set is deemed complete on the source array 700. The set manager 812 may then send an acknowledgement to the source array 700, informing it that the replication has been successfully completed. The source array 700 may then release any data pages and cleanup. The destination array 800 may not have applied the set yet, but there are multiple copies/logs of the data to protect in the event of a node failure.

FIG. 9 is a sequence diagram 900 of an example of replication transactions from a source array being applied by a target node in an asynchronous replication process. The process starts with a replication copy 902 wherein the transactions 904 are sent to a target node where a subset manager 906 adds the transactions to a subset. As each individual transaction 908 is received, an acknowledgement 910 is returned to confirm receipt. The subset manifest 912 is sent and an acknowledgment 914 is returned. The subset manifest 912 is added to the subset. The subset manager 912 confirms that all transactions in the set have been received and a message 916 is sent to the set manager 918 to inform it that the subset has been received.

The set manager 918 returns a message 920 instructing the subset manager 906 to apply the subset, e.g., send them to a volume 922 for storage. The subset manager 906 then applies the transactions 924 to the volume 922, which returns acknowledgements 926 indicating that the subset has been applied. The subset manager 906 then sends a message 928 to the set manager 918 to inform it that the subset has been applied. The set manager 918 replies with a set complete message 930. Once all subsets in a set are completed, the set manager 918 may send a message to the set manager of the source array informing it that the set is completed.

Figure 10:
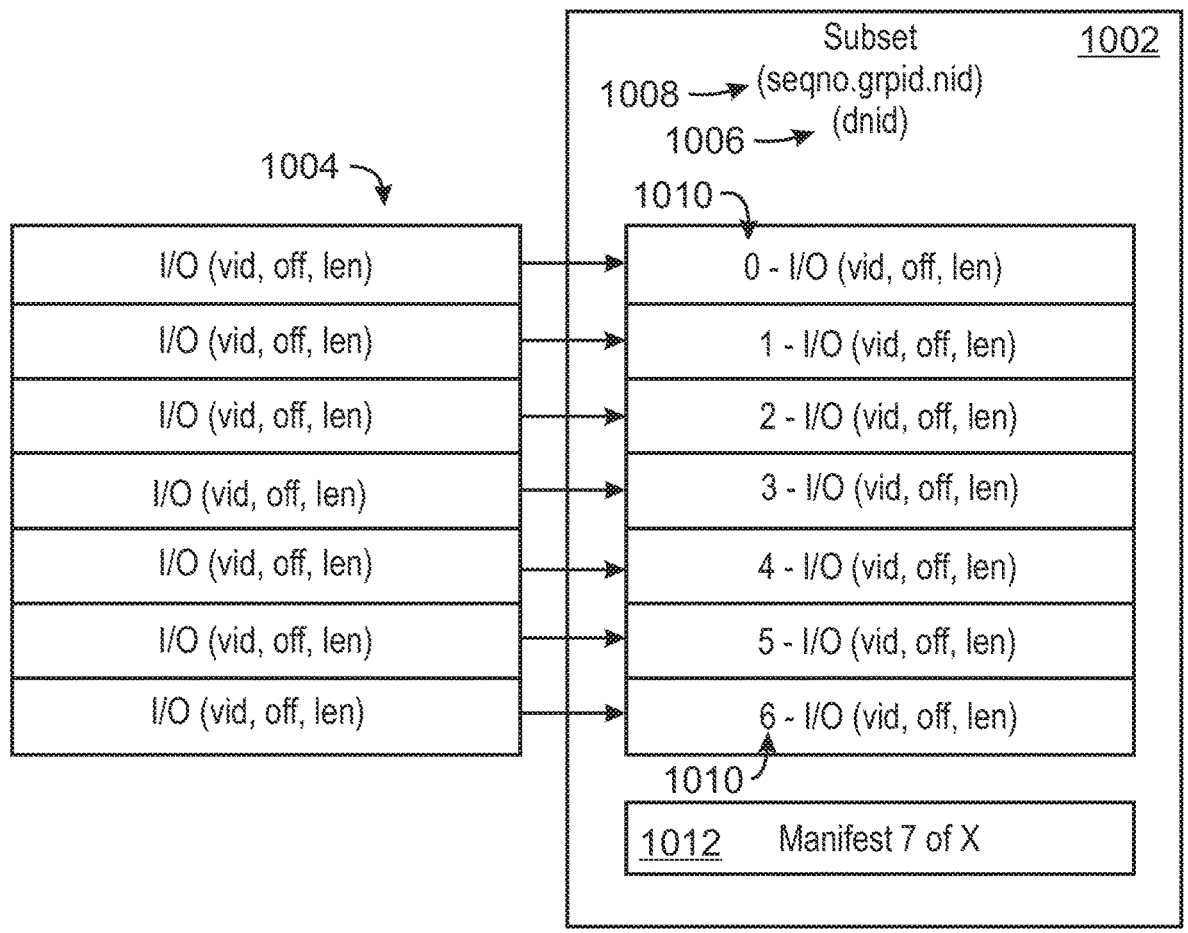
FIG. 10 is a schematic example of an origination node creating a subset of transactions for a single replication ticket.

FIG. 10 is a schematic example of an origination node 1000 creating a subset 1002 of transactions 1004 for a single replication ticket. If a subset 1002 does not exist for a replication ticket, it is created and a target node (dnid) 1006 will be chosen for the entire subset 1002. Each subset 1002 is uniquely identified by the replication ticket 1008 that includes the sequence number (seqno), replication group identification (grpid), and the node identification (nid).

As transactions 1004 are added to the subset 1002 they are issued with an IO index (ioidx) 1010 which is used to correlate transactions 1002 within the subset 1002. When the cluster seqno increments, the subset 1002 is complete and a subset manifest 1010 is generated which contains the subset and set totals. The set manager receives the subset totals and returns the sum of these values to each subset manager to be included in the subset manifest 1012, for example, in place of X.

Figure 11:
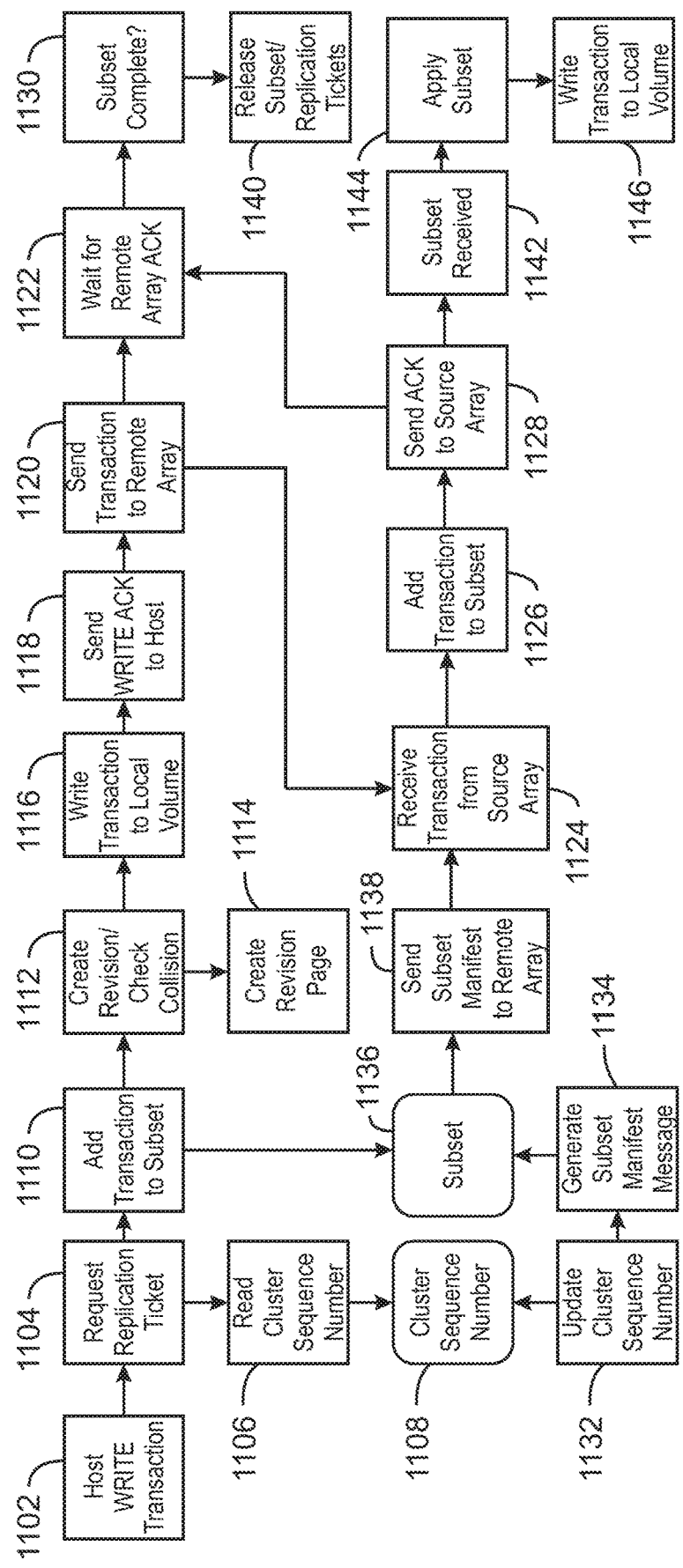
FIG. 11 is a process flow diagram of an example method for asynchronously replicating transactions from a source array to a destination array.

FIG. 11 is a process flow diagram of an example method 1100 for asynchronously replicating transactions from a source array to a destination array. The method 1100 may be implemented by the origination nodes of the source array and destination nodes of the target array. The method 1100 begins at block 1102, when a host write transaction is received in an origination node in the source array. At block 1104 a replication ticket is requested for the transaction. At block 1106 the cluster sequence number 1108 is read in order to create the replication ticket at block 1104.

At block 1110, the transaction is added to a subset by the origination node. At block 1112, a collision check is performed by the origination node to determine if the transaction will overwrite data that is still being replicated. At block 1114, if a collision has been detected, for example, between data with different sequence numbers, a revision page may be created by copying the data to a free cache memory page, as described further with respect to FIG. 18. At block 1116, the origination node writes the data to the local volume. At block 1118, a write acknowledgement is returned to the host, which is then free to send another transaction. At block 1120, the transaction is sent to the target node on the destination array, e.g., the remote array, for replication. At block 1122, the origination node waits for an acknowledgement from the target node.

At block 1124, the target node on the remote array receives the transaction from the origination node of the source array. At block 1126, the target node adds the transaction to a local subset, and, at block 1128, returns an acknowledgement to the origination node.

The origination node receives the acknowledgement at block 1122 and proceeds to block 1130 to determine if the subset is complete. A number of transactions may be sent following the method 1100 from block 1102 to block 1130. Further, it may be noted that a number of other origination nodes in the source array are also following this procedure to send transactions in the set to various target nodes on the destination array.

At block 1132, the cluster sequence number 1108 is updated, for example, when the time interval ends and a new interval begins. At this point, the origination node sends a count of the transactions in the subset to the set manager, which returns the total count of transactions to the origination node. The origination node creates the subset manifest at block 1134, which is added to the subset 1136 and, at block 1138, transferred to the target node, for example, by the procedure of steps 1124-1130. At this point, the origination node determines that the subset is complete, and releases the replication ticket at block 1140.

At block 1142, the target node confirms that the subset is received, for example, by comparing the subset manifest received to the manifest it has created as transactions were received. As noted with respect to FIG. 9, it may also inform the set manager for the destination array that the subset is complete and get instructions to apply the data to the local volume. At block 1144, the set manager instructs the target node to apply the data. At block 1146, the set manager writes the data to the local volume.

The method 1100 provides an overview of the steps taking place, but not every step needs to be present in every example. Further, steps may be included in more detailed views of particular parts of the method. Examples of these are described further with respect to FIGS. 12-15.

Figure 12:
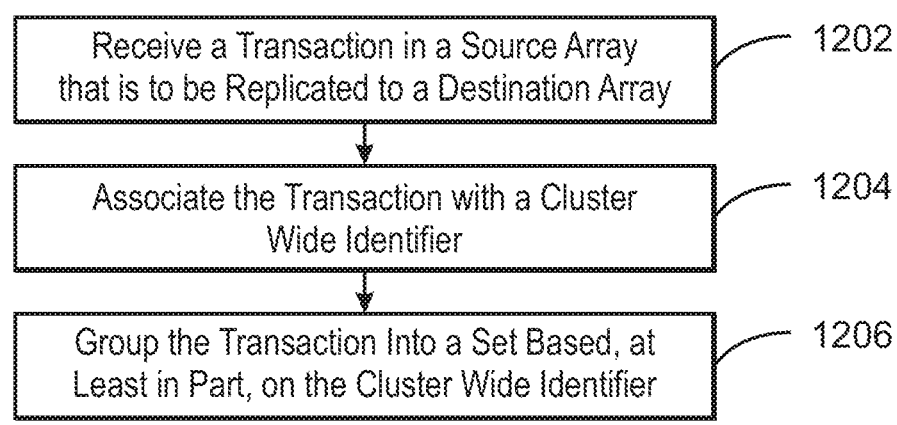
FIG. 12 is a process flow diagram of an example method for managing sets of transactions for replication.

FIG. 12 is a process flow diagram of an example method 1200 for managing sets of transactions for replication. The method begins at block 1202, when a transaction is received in a source array, for example, at an origination node, that is to be replicated to a destination array, for example, in a target node. At block 1204, the transaction is associated with a cluster wide correlator. As described herein, the cluster wide correlator may be created from a time interval during which the transaction is received. At block 1206, the transaction is grouped into a set, for example, based on the cluster wide correlator. Each set may corresponds to transactions received during an interval in time.

Figure 13:
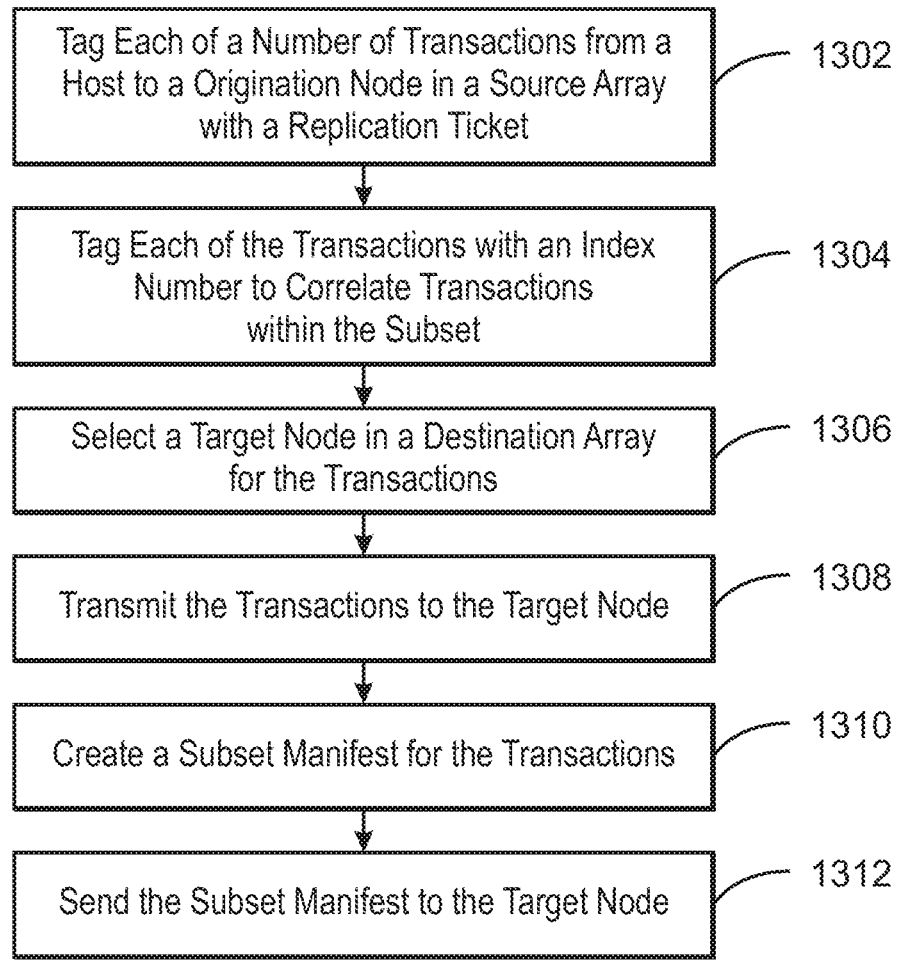
FIG. 13 is a process flow diagram of an example method for managing manifests for replication.

FIG. 13 is a process flow diagram of an example method 1300 for managing manifests for replication. The method 1300 begins at block 1302, with the tagging of each of a number of transactions from a host to an origination node in a source array with a replication ticket. The replication ticket may be used to group the transactions into a subset. At block 1304, each of the transactions may be tagged with an index number to correlate transactions within the subset. At block 1306, a target node in a destination array is selected for the transactions. At block 1308, the transactions are transmitted to the target node. At block 1310, a subset manifest is created for the transactions and, at block 1312, the subset manifest is sent to the target node.

Figure 14:
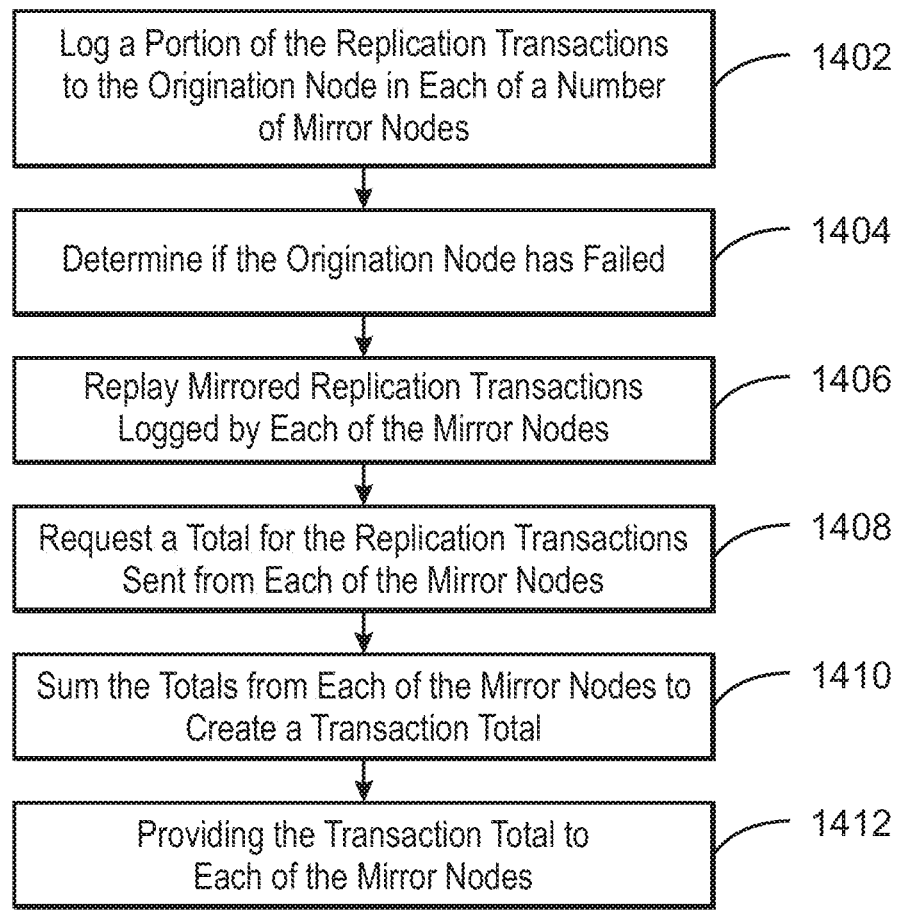
FIG. 14 is a process flow diagram of an example method for recovering from an origination node failure during an asynchronous replication.

FIG. 14 is a process flow diagram of an example method 1400 for recovering from an origination node failure during an asynchronous replication. The method 1400 begins at block 1402 with the logging a portion of the replication transactions to the origination node in each of a number of mirror nodes. The mirror nodes are origination nodes that share a logging function for another origination node between them. At block 1404, a determination is made if the origination node has failed. At block 1406, mirrored replication transactions logged by each of the mirror nodes are replayed. Each of the mirror nodes then recreates a corresponding partial subset of the recovered transactions. At block 1408, a total for the replication transactions sent from each of the mirror nodes is requested, for example, by the set manager in the source array. At block 1410, the totals from each of the mirror nodes are summed to create a transaction total. At block 1412, the transaction total is provided to each of the mirror nodes.

Figure 15:
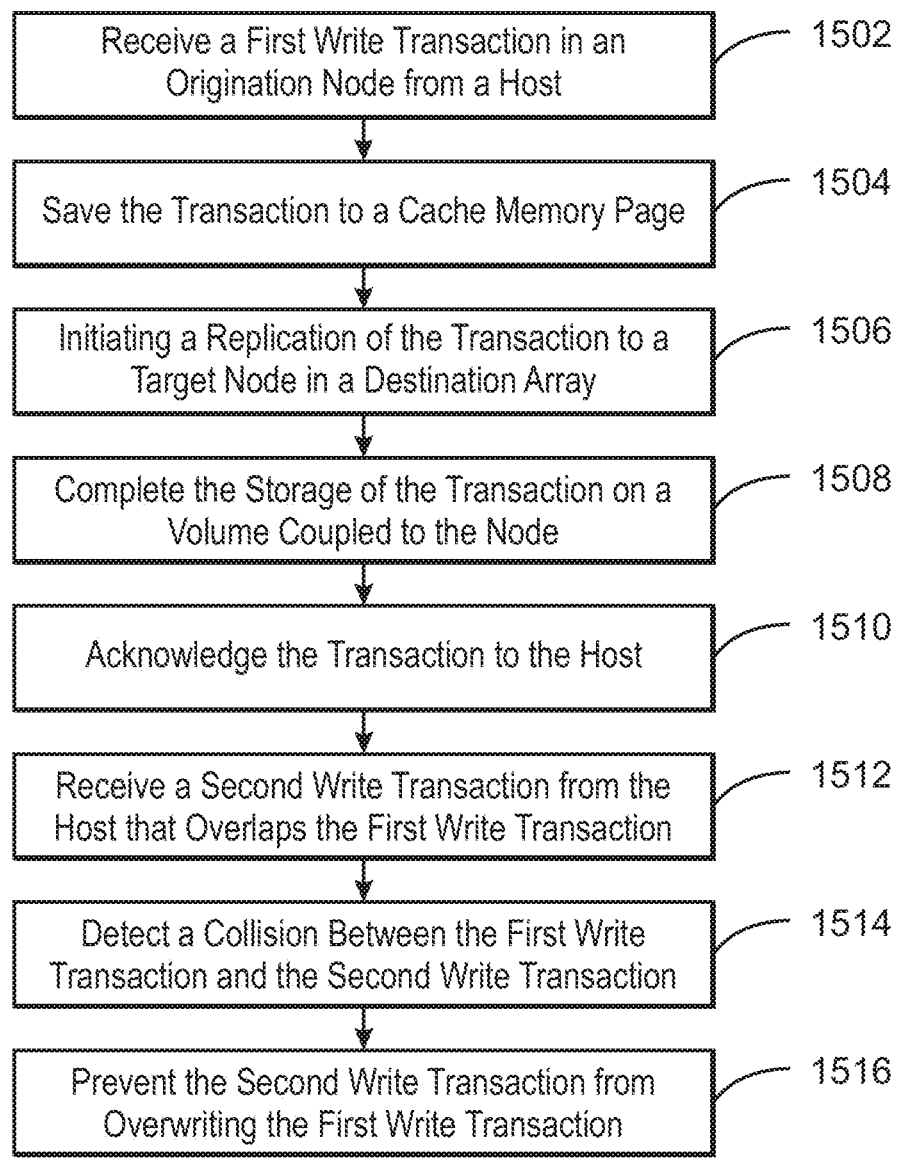
FIG. 15 is a process flow diagram of an example method for collision handling during an asynchronous replication.

FIG. 15 is a process flow diagram of an example method 1500 for collision handling during an asynchronous replication. As each write transaction completes on the source array the host application is free to send another write transaction to the same volume at the same offset and length. The nature of asynchronous streaming replication means that the previous write transaction may not have been transmitted to the target array yet. This is an IO collision, the data at that specific volume, offset and length needs to be preserved for transmission, however the host cannot be prevented from overwriting this region of the volume. A mechanism that may preserve the data between sets is creating revision pages.

The method 1500 begins at block 1502, when a first write transaction is received in an origination node from a host. At block 1504, the transaction is saved to a cache memory page. At block 1506, a replication of the transaction to a target node in a destination array is initiated. At block 1508, the storage of the transaction on a volume coupled to the node is completed and, at block 1510, the transaction is acknowledged to the host. At block 1512, a second write transaction is received from the host that overlaps the first write transaction. At block 1514, a collision between the first write transaction and the second write transaction is detected. At block 1516, the second write transaction is prevented from overwriting the first write transaction. This may be performed by merging transactions onto a single page, for example, if a collision happens in a single sequence number, or by creating revision pages, for example, if a collision happens between sequence numbers. This is discussed further with respect to FIGS. 16-18.

Figure 16:
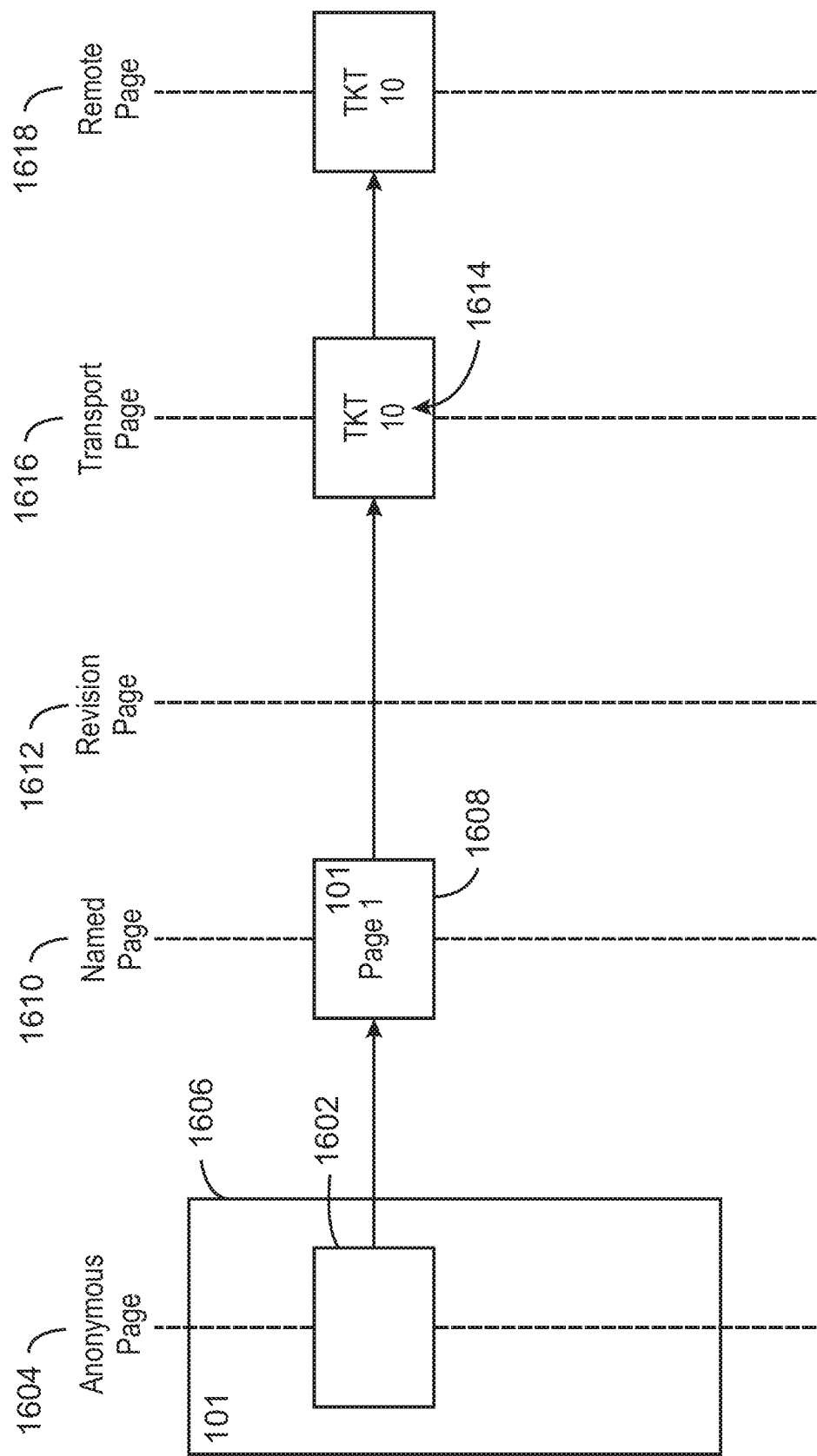
FIG. 16 is a schematic example diagram of illustrating the transfer of a cache memory page from an origination node to a target node in the absence of any collisions.

FIG. 16 is a schematic example diagram of illustrating the transfer 1600 of a cache memory page from an origination node to a target node in the absence of any collisions. Transactions arrive in the origination node and are stored in a cache memory page 1602 that is an anonymous page 1604, e.g., a buffer page. The transactions in the cache memory page have an associated cluster wide correlator, such as a cluster sequence number 1606.

In this example, the data in the cache memory page 1602 is in cluster sequence number 1606 when it is first received. The cache memory page 1602 is transferred to a cache memory page 1608 that is a named page 1610, for example, using the cluster sequence number 101. As there are no other pages that are attempting to be stored in the same place as a named page 1610, there are no collisions, and no need to create cache memory pages that are revision pages 1612.

As there are no collisions, the cache memory page 1608 in the named page 1610 is provided a ticket number 1614 to form a transport page 1616. The transport page 1616 is then sent to the remote cache memory, for example, in the target node. The remote page 1618 can then be added to the remote subset and processed.

If two pages arrive in the named page 1610, for example, with a single cluster sequence number, the transactions for the second page may overwrite the first page. This can be handled by merging the transactions into a single page before transferring the merged page under a single ticket number.

Figure 17:
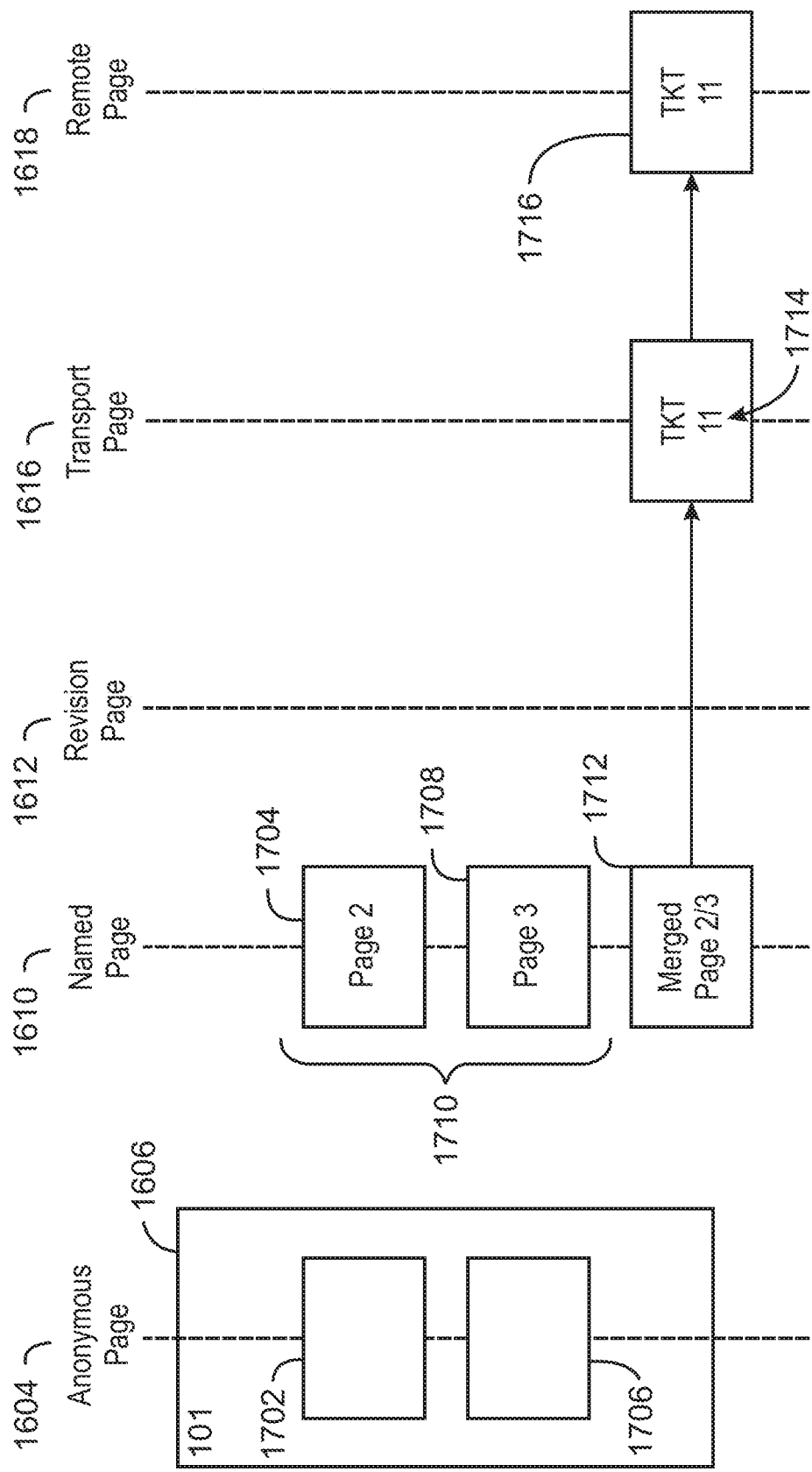
FIG. 17 is a schematic example diagram of two pages with the same cluster sequence number that have a collision being merged into a single page with a single assigned replication ticket.

FIG. 17 is a schematic example diagram of two pages with the same cluster sequence number that have a collision being merged into a single page with a single assigned replication ticket. Like numbered items are as described with respect to FIG. 16. Transactions forming a first page 1702 are received in the origination node and may be named using the cluster sequence number to form a named page 1704. Transactions forming a second page 1706 are received and may form a second named page 1708. However, if the transactions forming the second page were written into a second named page 1708, the first named page may be overwritten. The potential collision 1710 may be detected and prevented by merging the transaction data to form a single named page 1712. The named page 1712 is issued a replication ticket number 1714, forming a transport page 1616, which is sent on to the target node, forming a remote page 1716. The remote page 1716 can be processed normally by the target node.

Figure 18:
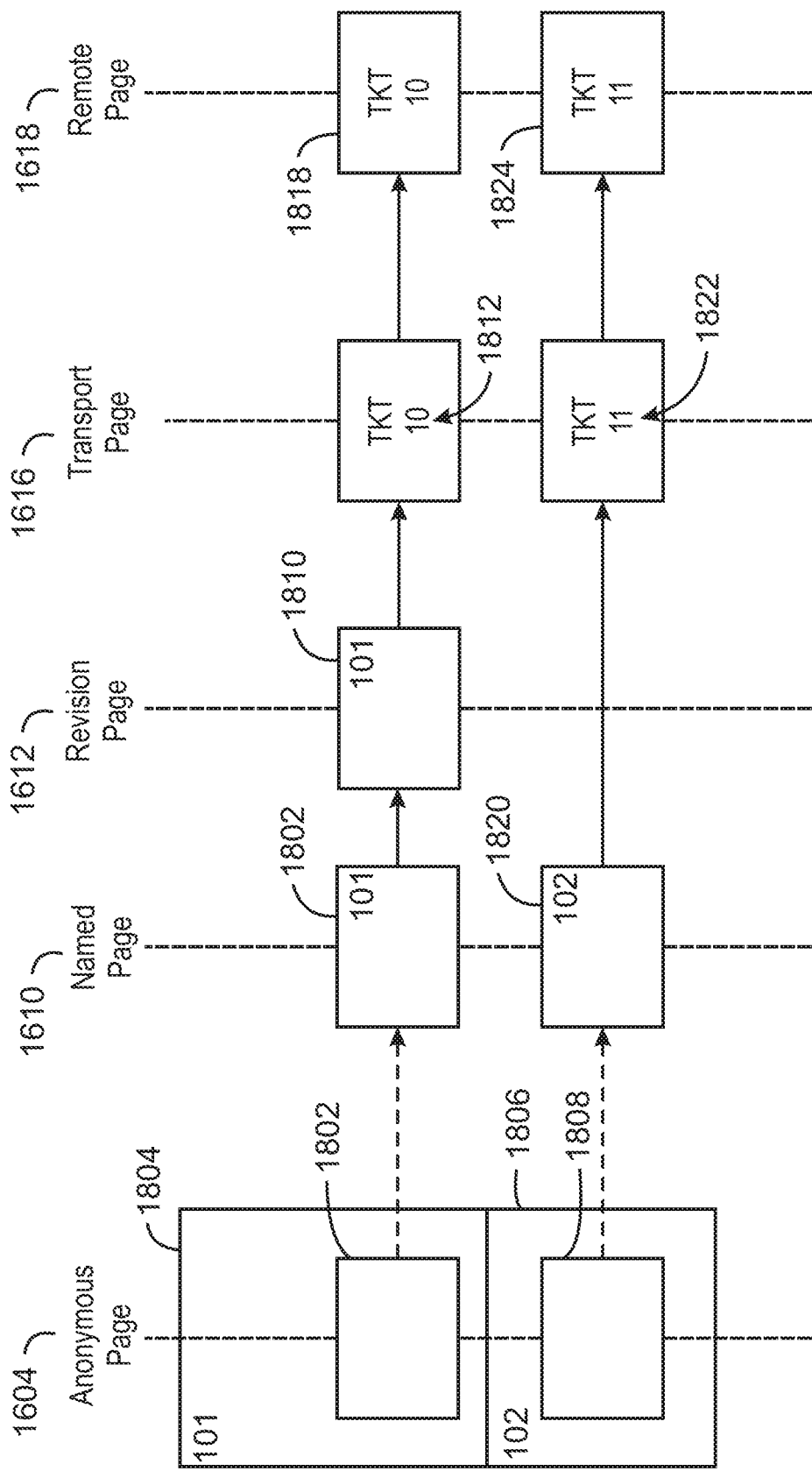
FIG. 18 is a schematic example diagram of a revision page created to protect a named page from being overwritten by a named page created from data in a different sequence number.

FIG. 18 is a schematic example diagram of a revision page created to protect a named page from being overwritten by a named page created from data in a different sequence number. Like numbered items are as described with respect to FIG. 16. As used herein, revision pages 1612 are cache memory pages that are copied to free cache memory pages. The revision pages 1612 may be tagged with a replication ticket, indicating that the page is being used for replication and should be protected. A revision page 1612 can have several references from different requests covering either the same or different regions of the cache memory page. Reference counts are used to track how many outstanding remote copy requests need the revision page. Once the reference count drops to zero, the revision page 1612 is released. In the example of FIG. 18, transaction data forming cache memory page 1802 is received under a first sequence number 1804. The cache memory page 1802 is moved to a named page 1610. When the cluster sequence number increments to form a new sequence number 1806 another cache memory page 1808 is received.

However, the cache memory page 1802 may still be in the process of transferring. In this case, a potential collision is detected. To protect the data, and free the named page 1610, the cache memory page 1802 is copied to a free page, creating a revision page 1810. The duplicate of the cache memory page 1802 may be made on a different node with a log entry created between these nodes to indicate the details of the revision page 1810. The instantiation of the revision page 1810 in a new location allows the named page 1610 to be released for the host to update as usual.

The revision page 1810 may be given a ticket number, forming a first transport page 1812, which is copied to a remote page 1818 and processed by the target array. The second page 1820 may then be given a subsequent ticket number to form another transport page 1822, before being sent on to a remote page 1824 for processing by the target node.

Figure 19:
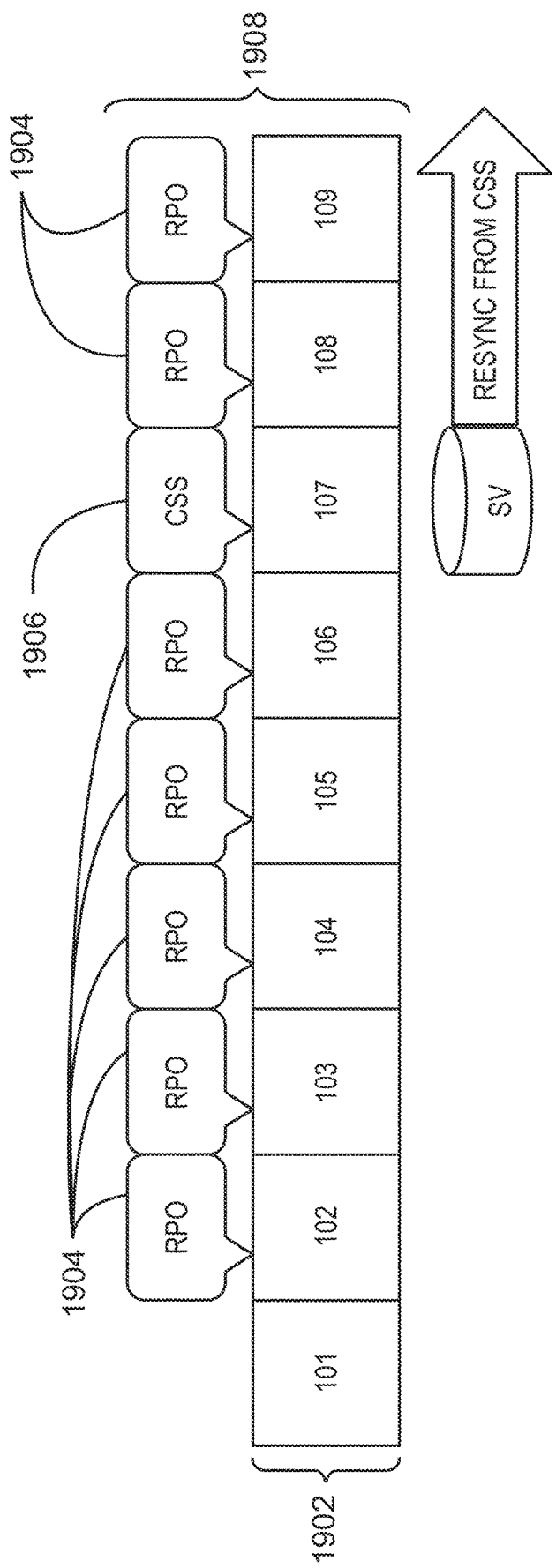
FIG. 19 is a schematic example of a coordinated snapshot (CSS) used to provide a restart point for synching a source array with a destination array.

FIG. 19 is a schematic example of a coordinated snapshot (CSS) used to provide a restart point for synching a source array with a destination array. The initial synchronization of asynchronous streaming groups will be performed in the same manner as synchronous and asynchronous periodic modes. Synchronous ticketing will prevent write transactions to regions of the volume that are being read and sent to the remote array.

When the remote copy group is in sync, sets 1902 will be flowing between the arrays. As sets are applied, the RPO 1904 moves forward with the sets. The RPO 1904 denotes the amount of data loss that an enterprise can withstand in the event of a disaster without any significant impact to their business operations. Asynchronous streaming replication will provide an RPO 1904 of 30 seconds or less without the host latency impact of synchronous replication.

However, it may not be possible to track each set for group restart purposes. Further, there is no set mechanism that allows a consistency point to be determined, for example, to restart the process in case of failure. For this consistency point a snapshot is required. Periodically a coordinated snapshot (CSS) 1906 may be taken on both the source and destination volumes. The snapshot request will be inserted into the data stream 1908. The CSS 1906 may provide a group consistent restart point between source and target arrays.

Fault tolerance may also be an issue for asynchronous streaming replication. The main concerns for fault tolerance are a failed link and a failed node. Link failures may cause the system to become unbalanced with respect to replication link capacity, which may lead to some or all replication groups to stop. A group policy can be defined which will allow the user to prioritize which groups to stop if the solution become unsustainable. This policy monitors the utilization of source array cache and may be triggered when the acceptable usage limits are breached. Failed nodes may also cause problems for the replication solution, and may be handled using the same policy. Techniques for providing fault tolerance for link failures and node failures are described with respect to FIGS. 20 and 21.

Figure 20:
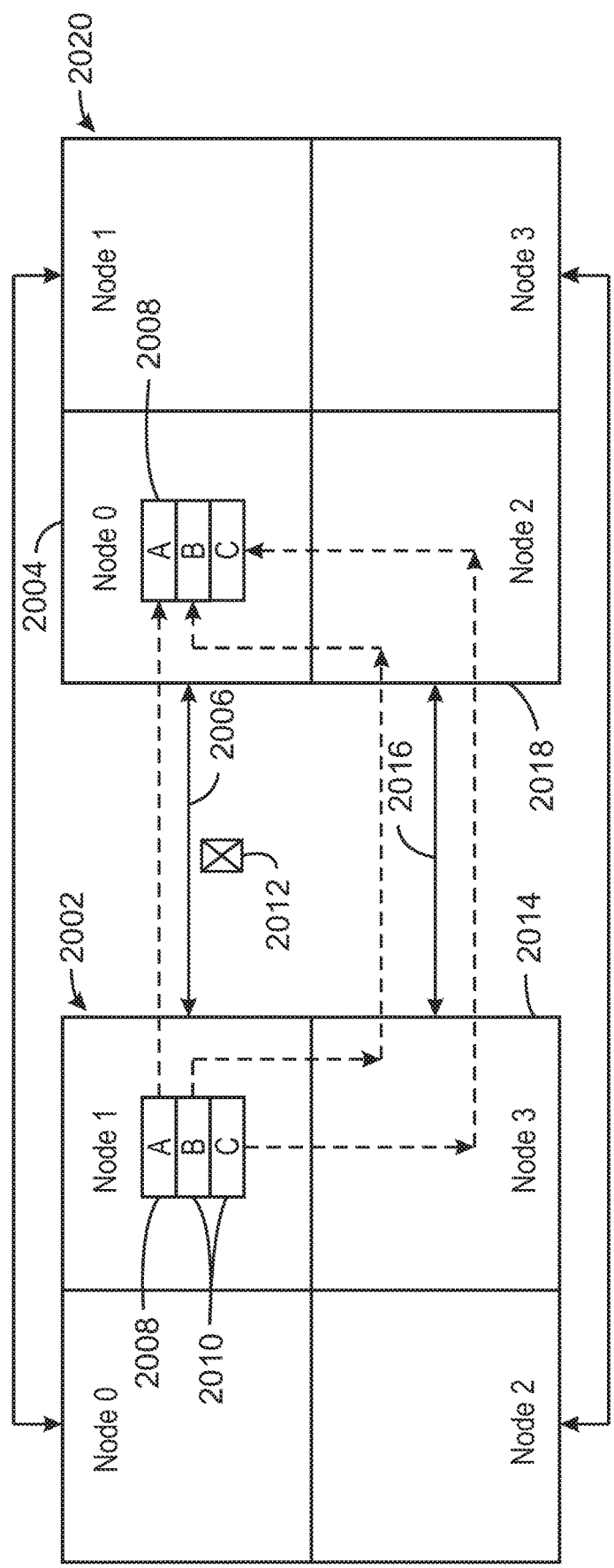
FIG. 20 is a schematic example of replication transactions being transferred from an origination node to a target node after a failure of a direct link between the nodes.

FIG. 20 is a schematic example of replication transactions being transferred 2000 from an origination node 2002 to a target node 2004 after a failure of a link 2006 between the nodes 2002 and 2004. In this example, a first transaction 2008 is successfully transferred from the origination node 2002 over the link 2006 to the target node 2004. However, before succeeding transactions 2010 can be transferred, the link fails 2012.

In this example, the succeeding transactions 2010 are transferred to a second origination node 2014 that has an operational link 2016 to a second target node 2018. From the second origination node 2014, the transactions are transferred to the second target node 2018 over the operational link 2016. Once at the second target node 2018, the transactions may be transferred to the target node 2004.

This technique assumes sufficient bandwidth exists in the remaining operational links between the source array 2002 and the destination array 2020 to handle the normal traffic in addition to the traffic that had been carried by the failed link 2006. As noted, a policy may be defined to prioritize transfers of transactions between the arrays if overload conditions may lead to replication failures.

Figure 21:
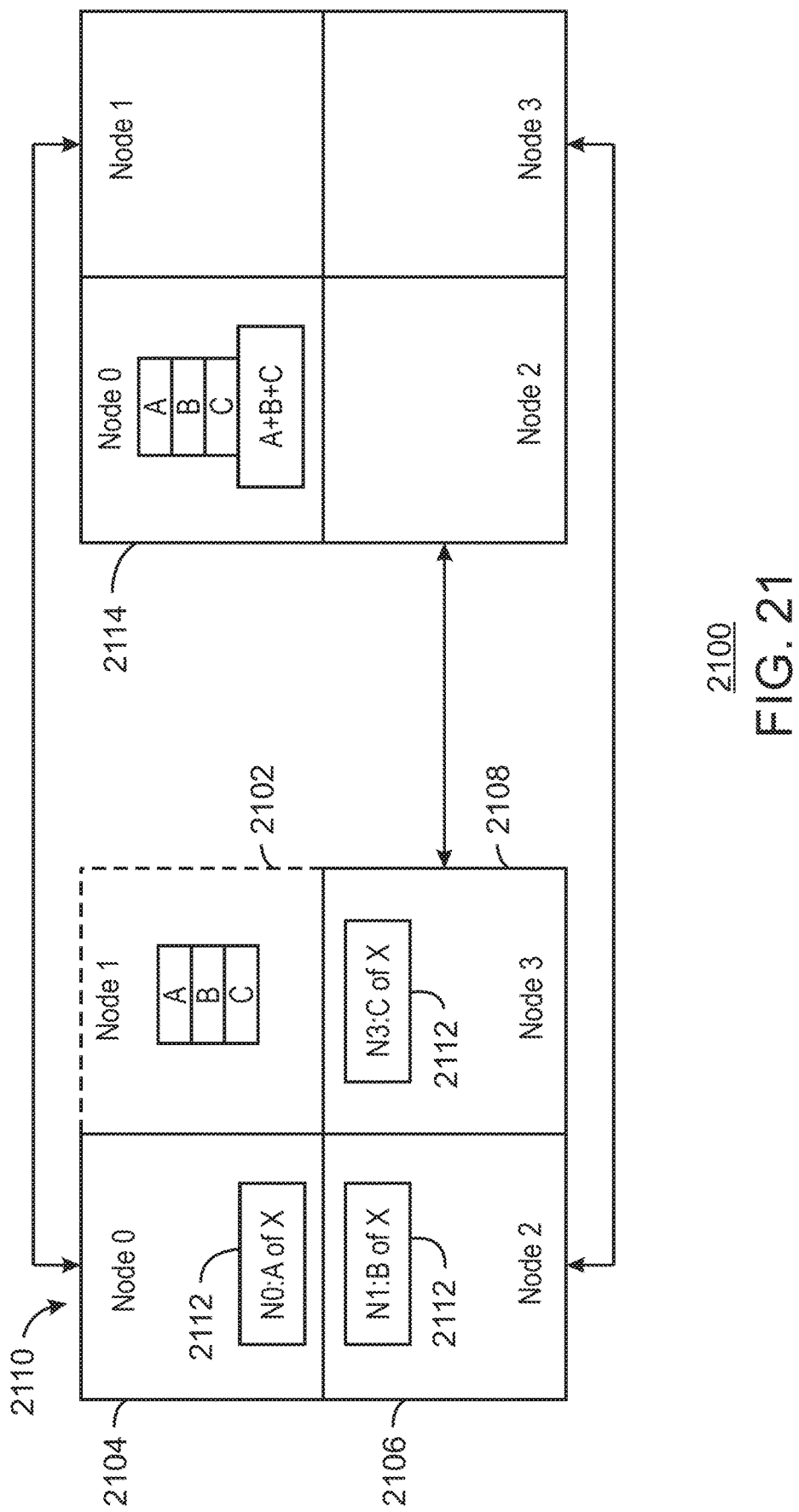
FIG. 21 is a schematic example of replication transactions being recovered after a node failure.

FIG. 21 is a schematic example of replication transactions being recovered after a node failure. All replication transactions are logged to mirror memory, e.g., in other origination nodes in the source array, which are termed mirror nodes herein. In addition to the transactions, the log includes the identifying details such as the sequence number, replication group id and target node id. For example, transactions (A, B, and C) in an origination node 1 2102 may be logged in origination node 0 2104 (A), origination node 2 2106 (B), and origination node 3 2108 (C).

If origination node 1 2102 fails, the transactions may be recovered and sent by the mirror nodes 2104, 2106, and 2108. The transactions may also be replayed and relogged by the mirror nodes 2104, 2106, and 2108. However, the subset for origination node 1 2102 will have become fragmented across the source array 2110.

Accordingly, each mirror node 2104, 2106, and 2108 may replay the transactions it has recovered, and create a partial subset to log the details for the transaction counts. The set manager for the source array may request set totals for any inflight sets. Each mirror node will respond with subset totals for the failed node.

The set manager will reconstruct the total transaction count for the failed node, e.g., origination node 1 2102, from the partial counts from each mirror node 2104, 2106, and 2108 and return a set total to each mirror node 2104, 2106, and 2108. Once the mirror nodes 2104, 2106, and 2108 have the set totals, they can rebuild a partial subset manifest 2112 for the transaction they have recovered. The partial manifests may each be sent to the target node by operational links between the mirror nodes and other target nodes, for example, as discussed with respect to FIG. 20.

At the target node 2114, the partial set manifests are accumulated to create a set manifest for the failed node. This can be used to confirm that the set is complete. As for a link failure, a node failure may lead to replication failure due to the extra loading. Accordingly, as for the link failure, policies may be defined to prioritize the transactions for replication.

Figure 22:
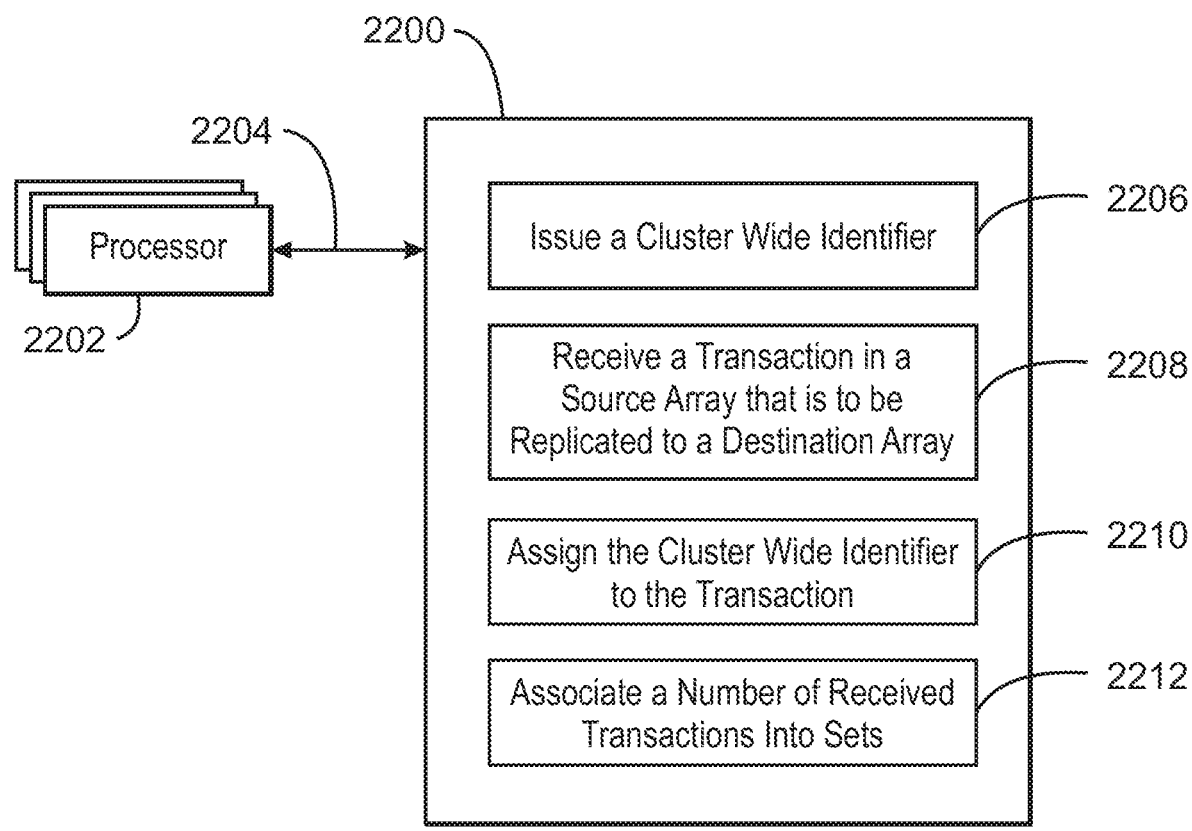
FIG. 22 is an example non-transitory machine readable medium that contains code for managing sets of transactions for replication.

FIG. 22 is an example non-transitory machine readable medium 2200 that contains code for managing sets of transactions for replication. The machine readable medium 2200 is linked to one or more processors 2202, for example, by a high speed interconnect 2204. The machine readable medium 2200 contains code 2206 to direct the processors 2202 to issue a cluster wide correlator. This may be based, for example, on a time interval. Code 2208 may be included to direct the processors 2202 to receive a transaction in a source array that is to be replicated to a destination array.

Code 2210 may be included to assign the cluster wide correlator to the transaction. Further, code 2212 may be included to associate a number of transactions into sets. For example, this may be based on the cluster wide correlator assigned to each of the transactions.

Figure 23:
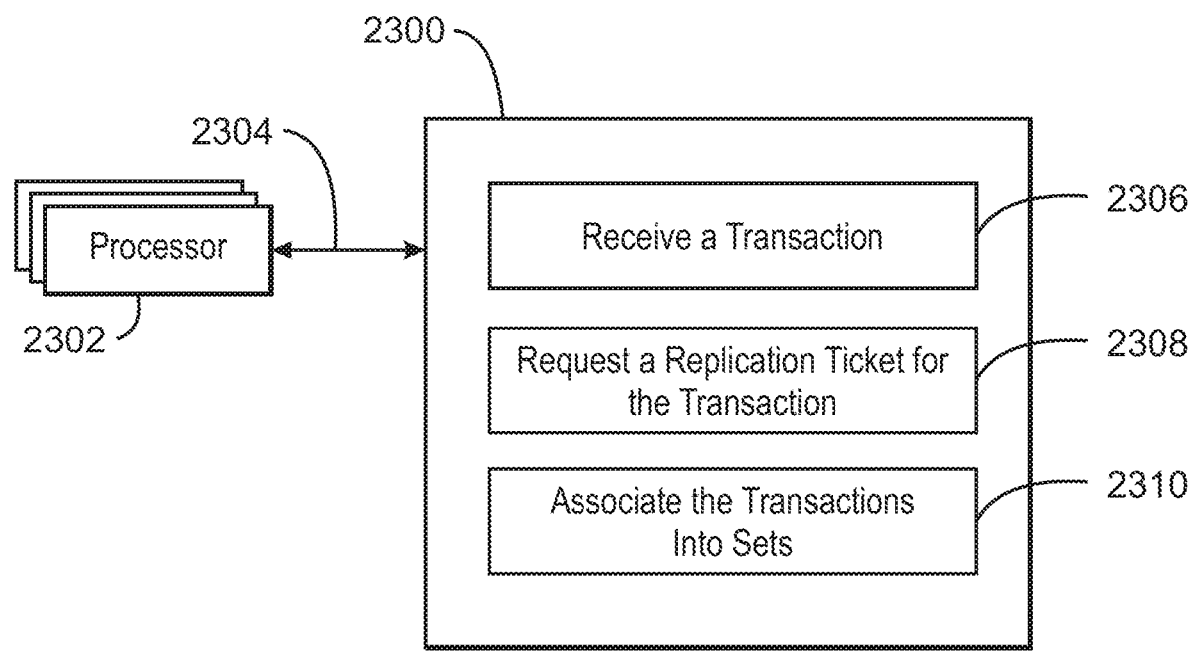
FIG. 23 is an example non-transitory machine readable medium that contains code to managing manifests for replication.

FIG. 23 is an example non-transitory machine readable medium 2300 that contains code to managing manifests for replication. The machine readable medium 2300 is linked to one or more processors 2302, for example, by a high speed interconnect 2304. The machine readable medium 2300 may include code 2306 to direct the processors 2302 to receive a transaction in a source array that is to be replicated to a destination array. Code 2308 may be included to request a replication ticket for the transaction from a remote copy ticket dispenser. The replication ticket may include a sequence number and replication group for the transaction. Further, code 2310 may be included to associate the transactions into sets. This may be based, for example, on the ticket number.

Figure 24:
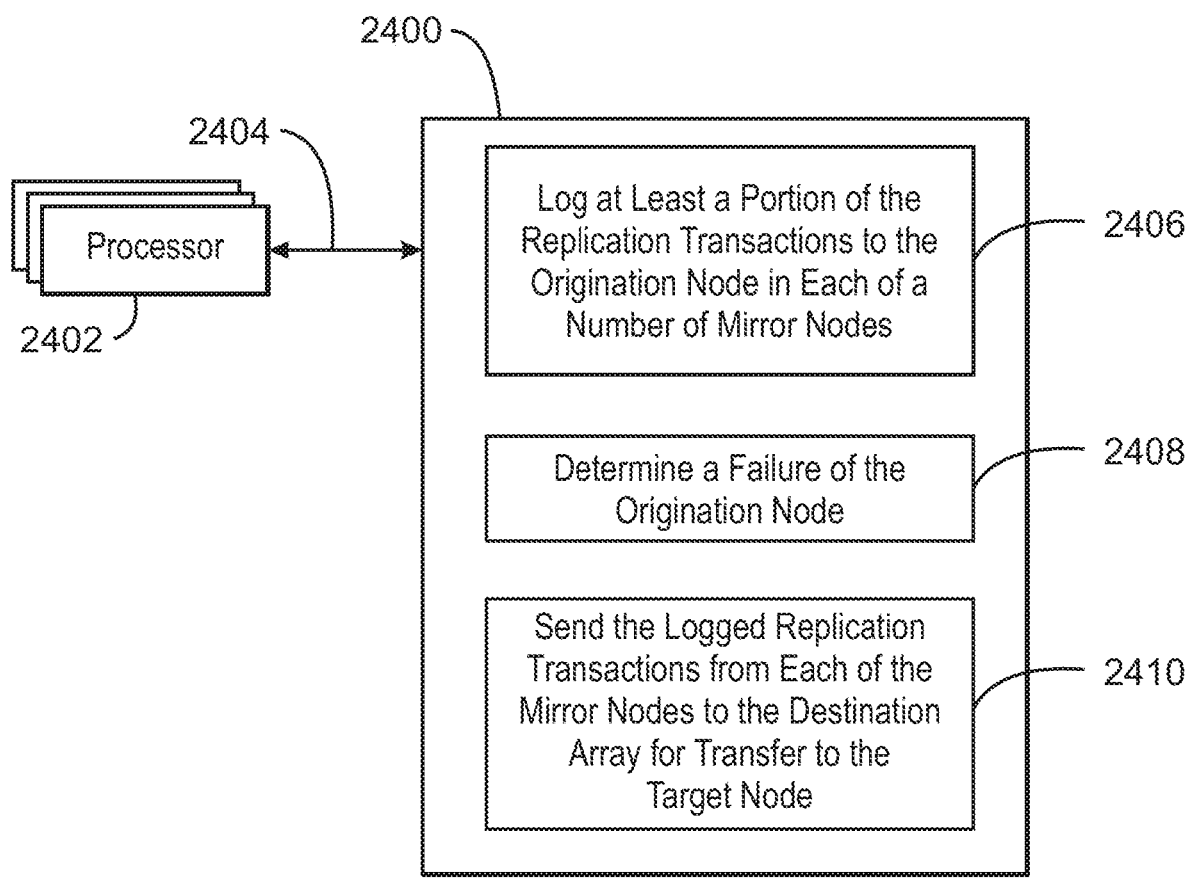
FIG. 24 is an example non-transitory machine readable medium that contains code to recover from an origination node failure during an asynchronous replication.

FIG. 24 is an example non-transitory machine readable medium 2400 that contains code to recover from an origination node failure during an asynchronous replication. The machine readable medium 2400 is linked to one or more processors 2402, for example, by a high speed interconnect 2404. The machine readable medium 2400 includes code 2406 to direct the processors to log at least a portion of the replication transactions to the origination node in each of a number of mirror nodes. Code 2408 is included to determine a failure of the origination node. The machine readable medium 2400 also includes code 2410 to send the logged replication transactions from each of the plurality of mirror nodes to a corresponding node in the destination array for transfer to the target node.

Figure 25:
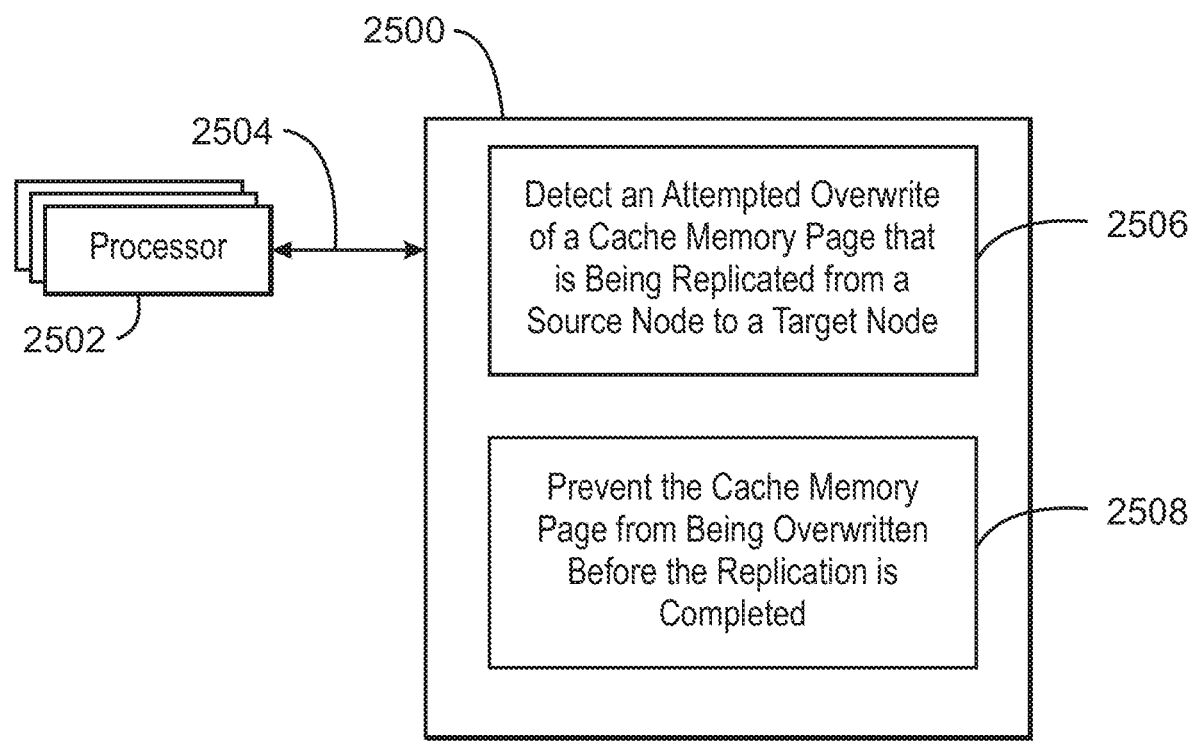
FIG. 25 is an example non-transitory machine readable medium that contains code to handle collisions during an asynchronous replication.

FIG. 25 is an example non-transitory machine readable medium 2500 that contains code to handle collisions during an asynchronous replication. The machine readable medium 2500 is linked to one or more processors 2502, for example, by a high speed interconnect 2504. The machine readable medium 2500 includes code 2506 to direct the processors 2502 to detect an attempted overwrite of a cache memory page that is being replicated from a source node to a destination node. Code 2508 is also included to prevent the cache memory page from being overwritten before the replication is completed.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A method for collision handling during asynchronous replication, the method comprising:
   receiving a first write transaction in an origination node from a host, wherein the host is separate from a destination array;
   saving the transaction to a first cache memory page, wherein the asynchronous replication comprises replication of the first cache memory page to a target node in the destination array after the saving of the transaction to the first cache memory page;
   moving the first cache memory page to a named page;
   completing storage of the first write transaction on a volume coupled to the origination node;
   acknowledging the first write transaction to the host;
   receiving, from the host, a second write transaction of a second cache memory page;
   in response to detecting a collision between the first and second cache memory pages, and the replication of the first cache memory page to the target node in the destination array being incomplete, copying the first cache memory page to a free page to create a revision page and free the named page; and
   copying the revision page to the target node in the destination array to complete the replication of the first cache memory page.

2. The method of claim 1, comprising tagging the revision page with a replication ticket.

3. The method of claim 1, comprising:
   after copying the cache memory page to the free page:
   releasing the named page for writing.

4. The method of claim 1, comprising:
   receiving a third write transaction of a third cache memory page in the origination node from a host, the second and third cache memory pages being of a single sequence number;
   detecting a collision between the second and third cache memory pages;
   merging the second and third write transactions to form a single named page; and
   sending the single named page comprising the merged second and third write transactions to the destination array.

5. The method of claim 1, comprising determining a consistent synchronization point for the replication of transactions between a source array and the destination array.

6. The method of claim 5, comprising:
   inserting a snapshot request into a data stream between the source array and the destination array; and
   capturing a coordinated snapshot of the source array.

7. The method of claim 6, comprising resynchronizing the source array and the destination array from the coordinated snapshot.

8. The method of claim 1, wherein the copying the cache memory page to the free page to create the revision page and to free the named page is in response to:
   detecting a collision between the first write transaction and the second write transaction, when the first and second write transactions are part of different sequence numbers.

9. The method of claim 1, further comprising:
   after copying the cache memory page to the free page to create the revision page and free the named page:
   copying another cache memory page, including the second write transaction, to the freed named page.

10. A system for collision handling during asynchronous replication, the system comprising:
    a cache memory system comprising a plurality of cache memory pages;
    a processor; and
    a non-transitory machine readable medium comprising instructions executable by the processor to:
      receive a first write transaction in an origination node from a host, wherein the host is separate from a destination array;
      save the transaction to a first cache memory page, wherein the asynchronous replication comprises replication of the first cache memory page to a target node in the destination array after saving the transaction to the first cache memory page;
      detect when a host is attempting to overwrite the first cache memory page with a second cache memory page when the replication of the first cache memory page to the target node in the destination array is incomplete, wherein the destination array is separate from the host;

based on the detection, copy the first cache memory page to a free page to create a revision page; and copy the revision page to the target node in the destination array to complete the replication of the first cache memory page.

11. The system of claim 10, wherein the instructions are executable by the processor to:

detect a collision between the second cache memory page and a third cache memory page being of the same sequence number; and combine the second and third memory pages that have the detected collision and that have the same sequence number.

12. The system of claim 10, wherein the instructions are executable by the processor to capture a snapshot of a source array and the destination array.

13. The system of claim 12, wherein the instructions are executable by the processor to use the snapshot to resynchronize the source array and the destination array.

14. A non-transitory, machine readable medium comprising code to handle collisions during asynchronous replication by directing a processor to:

receive a first write transaction in an origination node from a host, wherein the host is separate from a destination node;

save the transaction to a first cache memory page, wherein the asynchronous replication comprises replication of the first cache memory page from the origination node to the destination node after saving the transaction to the first cache memory page;

when the replication of the first cache memory page from the origination node to the destination node is incomplete, detect an attempted overwrite of the first cache memory page with a second cache memory page; and based on the detection:
copy the first cache memory page to a free page to create a revision page; and
copy the revision page to the destination node to complete the replication of the first cache memory page.

* * * * *